United States Patent [19]
Bemanian et al.

[11] Patent Number: 5,857,087
[45] Date of Patent: Jan. 5, 1999

[54] METHOD OF HANDSHAKING IN A DATA COMMUNICATIONS BUS

[75] Inventors: Majid Bemanian, Fremont; John Bailey, Calabassas, both of Calif.

[73] Assignee: Timeplex, Inc., Woodcliff Lake, N.J.

[21] Appl. No.: 918,091

[22] Filed: Aug. 25, 1997

Related U.S. Application Data

[62] Division of Ser. No. 778,785, Jan. 6, 1997, Pat. No. 5,809,258, which is a continuation of Ser. No. 295,506, Aug. 23, 1994, abandoned.

[51] Int. Cl.[6] ............................................. G06F 13/00
[52] U.S. Cl. ..................... 395/309; 395/200.65; 370/438
[58] Field of Search .............................. 395/200.65, 309, 395/290; 370/438

[56] References Cited

U.S. PATENT DOCUMENTS

| | | | |
|---|---|---|---|
| 5,237,567 | 8/1993 | Nay et al. ............................... | 370/85.1 |
| 5,287,477 | 2/1994 | Johnson et al. ......................... | 395/425 |
| 5,404,463 | 4/1995 | McGarvey ............................... | 395/280 |
| 5,416,910 | 5/1995 | Moyer et al. ............................ | 395/280 |
| 5,509,125 | 4/1996 | Johnson et al. ......................... | 395/300 |
| 5,699,516 | 12/1997 | Sapir et al. ......................... | 395/200.01 |
| 5,732,244 | 3/1998 | Gujral ..................................... | 395/468 |
| 5,793,996 | 8/1998 | Childers et al. ......................... | 395/309 |

*Primary Examiner*—Meng-Ai T. An
*Assistant Examiner*—David A. Wiley
*Attorney, Agent, or Firm*—Steven C. Sereboff; Sereboff & Buyan, LLP

[57] ABSTRACT

A pipelined bus which can support more than one channel between data sources and data destinations at a time. The bus includes an arbitration bus, a command bus and a data bus. In accordance with the bus protocol, different channels may access the various bus components in the same clock cycle. For example, the data source of one channel may issue a command on the command bus to its selected data destination to get ready to receive data while at the same time, a data source of a second channel actually transmits data on the data bus to its selected data destination. During the same clock cycle, a third data source can be selected by the arbitration bus to initiate or resume a channel. In the following clock cycle, the third data source can transmit a command on the command bus to its selected data destination to get ready to receive data, the second data source can transmit data on the data bus to its data destination and a fourth data source can be selected by the arbitration bus to initiate or resume a channel. In this manner, the set up and delivery of data for the different channels overlap in each clock cycle. Because a particular channel is not always ready to send or receive data, it has been found that such an arrangement increases the overall efficiency of the bus.

34 Claims, 30 Drawing Sheets

| COMMANDS | | RESPONSES | |
|---|---|---|---|
| CHREQ | - Channel Request | ACKCH | - Acknowledge CHREQ |
| DAV | - Data Available | ACK | - Acknowledge data |
| LDAV | - Last Data Available | NAK | - Negative acknowledge |
| NOP | - No Operation | DISC | - Disconnect channel |
| BRST | - Board Reset | EMPTY | - Empty slot |

FIGURE 7

|     | t17 | t18   | t19  | t20  | t21 | t22   | t23 | t24  | t25  | t26 |
| --- | --- | ----- | ---- | ---- | --- | ----- | --- | ---- | ---- | --- |
| ARB | 4   | 5     | 6    | 7    | 1   | 4     | 5   | 6    | 8    | 1   |
| CMD | NOP | CHREQ | DAV  | DAV  | NOP | DAV   | DAV | DAV  | LDAV | NOP |
| ADD | 0   | 7     | 3    | 2    | 0   | 8     | 7   | 3    | 2    | 0   |
| DAT | D21 | -     | -    | D511 | D62 | -     | D22 | D0   | D511 | D63 |
| RSP | ACK | EMPTY | AKCH | NAK  | ACK | EMPTY | ACK | ACK  | ACK  | ACK |

Figure 8

|     | t17 | t18   | t19  | t20 | t21 | t22 | t23 | t24 | t25 | t26 |
| --- | --- | ----- | ---- | --- | --- | --- | --- | --- | --- | --- |
| ARB | 4   |       |      |     |     | 4   |     |     |     |     |
| CMD |     | CHREQ |      |     |     |     |     | DAV |     |     |
| ADD |     | 7     |      |     |     |     |     | 7   |     |     |
| DAT |     |       |      |     |     |     |     | D0  |     |     |
| RSP |     |       | AKCH |     |     |     |     | ACK |     |     |

Figure 9

|     | t17 | t18 | t19 | t20  | t21 | t22 | t23 | t24  | t25  | t26 |
| --- | --- | --- | --- | ---- | --- | --- | --- | ---- | ---- | --- |
| ARB |     | 5   |     |      |     |     |     | 5    |      |     |
| CMD |     |     | DAV |      |     |     |     | DAV  |      |     |
| ADD |     |     |     |      |     |     |     | 3    |      |     |
| DAT |     |     |     | D511 |     |     |     |      | D511 |     |
| RSP |     |     |     | NAK  |     |     |     |      | ACK  |     |

Figure 10

|  | t17 | t18 | t19 | t20 | t21 | t22 | t23 | t24 | t25 | t26 |
|---|---|---|---|---|---|---|---|---|---|---|
| ARB |  |  | 6 |  |  |  |  |  | 6 |  |
| CMD |  |  |  | DAV |  |  |  |  | LDAV |  |
| ADD |  |  |  | 2 |  |  |  |  | 2 |  |
| DAT |  |  |  |  | D62 |  |  |  |  | D63 |
| RSP |  |  |  |  | ACK |  |  |  |  | ACK |

Figure 11

|  | t17 | t18 | t19 | t20 | t21 | t22 | t23 | t24 | t25 | t26 |
|---|---|---|---|---|---|---|---|---|---|---|
| ARB | 4 | 5 | 6 |  |  | 4 | 5 | 6 |  |  |
| CMD |  | CHREQ | DAV | DAV |  |  | DAV | DAV | LDAV |  |
| ADD |  | 7 | 3 | 2 |  |  | 7 | 3 | 2 |  |
| DAT |  |  | - | D511 | D62 |  |  | D0 | D511 | D63 |
| RSP |  |  | AKCH | NAK | ACK |  |  | ACK | ACK | ACK |

Figure 12

|  | t17 | t18 | t19 | t20 | t21 | t22 | t23 | t24 | t25 | t26 |
|---|---|---|---|---|---|---|---|---|---|---|
| ARB | 4 | 5 | 6 | 7 | 1 | 4 | 5 | 6 | 8 | 1 |
| CMD |  |  |  |  | NOP | DAV |  |  |  | NOP |
| ADD |  |  |  |  | 0 | 8 |  |  |  | 0 |
| DAT |  |  |  |  | - | D22 |  |  |  |  |
| RSP |  |  |  |  | EMPTY | ACK |  |  |  |  |

Figure 13

|     | t17 | t18   | t19  | t20  | t21 | t22  | t23 | t24 | t25  | t26 |
|-----|-----|-------|------|------|-----|------|-----|-----|------|-----|
| ARB | 4   | 5     | 6    | 7    | 1   | 4    | 5   | 6   | 8    | 1   |
| CMD | NOP | CHREQ | DAV  | DAV  | NOP | DAV  | DAV | DAV | LDAV | NOP |
| ADD | 0   | 7     | 3    | 2    | 0   | 8    | 7   | 3   | 2    | 0   |
| DAT | D21 | -     | -    | D511 | D62 | -    | D22 | D0  | D511 | D63 |
| RSP | ACK | EMPTY | AKCH | NAK  | ACK | EMPTY| ACK | ACK | ACK  | ACK |

Figure 29

| Signal Name | Setup time | Hold time |
|---|---|---|
| ARB Buses | 19 ns | 9 ns |
| CMD Buses | 12 ns | 11 ns |
| ADD Buses | 12 ns | 11 ns |
| RSP Buses | 12 ns | 11 ns |
| DAT Buses | 9 ns | 14 ns |

Figure 30

| Interrupt | Function |
|---|---|
| NMI (non-maskable) | Protection violation<br>Watchdog timeout<br>Parity error<br>NMI jumper |
| XINT0 | DMA request |
| XINT1 | Network port 1 |
| XINT2 | Network port 3 |
| XINT3 | Network port 2 |
| XINT4 | Network port 4 |
| XINT5 | UART interrupt |
| XINT6 | System timer |
| XINT7 | PIPE request |

Figure 31

| Signal Name | Direction | Description |
| --- | --- | --- |
| ADDR[2 .. 31] | CPU --> P-Bus | Address bus (unbuffered) |
| DATA[0 .. 31] | CPU --> P-Bus | Data bus (unbuffered) |
| BE[0 .. 3] - | CPU --> P-Bus | Byte enables (unbuffered) |
| CWRITE - | CPU --> P-Bus | H = Read / L = Write (buffered) |
| BBLAST | CPU --> P-Bus | Burst last (buffered) |
| DREQ[0 .. 3] - | P-Bus --> CPU | DMA request (4 channels) |
| DACK[0 .. 3] - | CPU --> P-Bus | DMA acknowledge (4 channels) |
| TC[0 .. 1] - | CPU --> P-Bus | DMA transmit terminal count |
| EOP[2 .. 3] - | P-Bus --> CPU | DMA receive termination |
| DRQINT- | P-Bus --> CPU | DMA request interrupt |
| PBINT- | P-Bus --> CPU | PIPE interrupt (TXDONE) |
| PRST- | CPU --> P-Bus | PIPE reset |
| PCLKP | CPU --> P-Bus | 33 MHZ CPU clock |

Figure 33

| Signal Name | Description | Direction |
| --- | --- | --- |
| CLK[0..3] | 20 MHZ P-Bus clock out | MNP --> CPU |
| ARBO[0..3] | 4-bit slot selection | MNP --> CPU |
| CMD[0..2] | 3-bit Command bus | CPU --> MNP |
| RSP[0..2] | 3-bit Response bus | CPU --> MNP |
| BOARDP | L = Arbitration board present | MNP --> CPU |
| CLKARB | P-Bus clock in | CPU --> MNP |

Figure 34

METHOD OF HANDSHAKING IN A DATA COMMUNICATIONS BUS

This is a division of application Ser. No. 08/788,785 filed on Jan. 6, 1997 which is a continuation of application Ser. No. 08/295,506, filed on Aug. 23, 1994, now abandoned.

NOTICE OF COPYRIGHTS

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

BACKGROUND OF THE INVENTION

1. Field of the Invention

The present invention relates generally to busses for use in electronic devices.

2. Description of Related Art

The use of a bus to communicate between many devices is well known. Several standard busses include the AT-bus (or ISA-bus) in the IBM Corporation (Armonk, N.Y.) PC-AT, the VME bus in the Digital Equipment Corporation (Maynard, Md.) VAX line of computers, and the S-bus in workstations from Sun Microsystems Corporation (Fremont, Calif.). These busses were developed with certain design goals dictated by their use in microcomputer systems. Microprocessor computers typically only require high data transfers to and from a RAM. In general, except for these data-intensive communications with the RAM, the other devices on the bus generally communicate only with the system processor. Since the system processor often needs to communicate with several devices seemingly simultaneously, communication by the system processor is often performed in time division multiplex (TDM). In these types of busses, typically only one apparatus can use the bus at any given time. This is not a problem because quantities of information are generally small enough that the bus is not a bottleneck. Communication of large amounts of data to and from the RAM is generally accomplished through demand memory access (DMA), which allows bursts of data between certain devices and the RAM.

Busses such as these have been adopted for use in apparatuses other than computers. One application has been in network routers. Network routers exemplify the apparatuses which include a number of devices, each having substantially equal priority on the bus, each transferring similar quantities and qualities of data, and each needing to transfer data to any of the other devices. Network routers have been developed which include busses based upon the VME-bus and the S-bus. However, these routers and other data-transfer-intensive applications differ from computers because of the quantity of data to be transferred on the bus, the quality of that data, and the data's destination. As a consequence, these prior busses have often been inadequate to provide sufficient data throughput for many router applications.

One attempt to overcome this problem has been to provide multiple busses to increase the amount of data which can be transferred through the router. However, this approach can significantly increase the cost and complexity of the router.

Another approach has been to increase the clock frequency of the bus so that the data rate is increased. However, at high clock frequencies, harmful electromagnetic radiation can occur. As a result, increasing the clock frequency can often require substantially increased shielding to prevent undesirable electromagnetic interference (EMI).

Therefore, it is an object of the invention to provide a bus for use in high data transfer apparatuses.

SUMMARY OF THE INVENTION

The present invention is directed to a bus which, in accordance with one aspect of the present invention permits access to the bus by more than one channel between a data source and a data destination at a time. Such an arrangement has been found to substantially increase the effective data throughput of the bus without necessitating increases in the clock speed of the bus.

In the illustrated embodiment, the bus includes various components including an arbitration bus, a command bus, and a data bus. In accordance with the bus protocol, different channels may access the various bus components in the same clock cycle. For example, the data source of one channel may issue a command on the command bus to its selected data destination to get ready to receive data while at the same time, a data source of a second channel actually transmits data on the data bus to its selected data destination. During the same clock cycle, a third data source can be selected by the arbitration bus to initiate or resume a channel. In the following clock cycle, the third data source can transmit a command on the command bus to its selected data destination to get ready to receive data, the second data source can transmit data on the data bus to its data destination and a fourth data source can be selected by the arbitration bus to initiate or resume a channel. In this manner, the set up and delivery of data for the different channels overlap in each clock cycle. Because a particular channel is not always ready to send or receive data, it has been found that such an arrangement increases the overall efficiency of the bus.

DESCRIPTION OF THE DRAWINGS

These and other advantages of the present invention are best understood with reference to the drawings, in which:

FIG. 7 is a table defining the commands and responses of the command\response protocol of the bus of FIG. 1;

FIG. 8 is a snap shot of bus activity;

FIG. 9 is a snap shot of bus activity for slot 4 of FIG. 8;

FIG. 10 is a snap shot of bus activity for slot 5 of FIG. 8;

FIG. 11 is a snap shot of bus activity for slot 6 of FIG. 8;

FIG. 12 is a snap shot of bus activity for slots 4–6 of FIG. 8;

FIG. 13 is a snap shot of bus activity for other slots of FIG. 8;

FIG. 29 is a snap shot of bus activity of FIG. 8 with highlights to indicate overlapping access to the bus.

FIG. 30 is a table indicating timing factors for the signals of the bus of FIG. 2;

FIG. 31 is a table of the interrupt functions of the interrupt controller of the CPU module of the processor board of FIG. 3;

FIG. 33 is a table of the signals of the bus interface to the CPU module of the processor board of FIG. 3; and FIG. 34 is a table of the signals of the arbitration board to the bus and CPU module of the processor board of FIG. 3.

DESCRIPTION OF THE APPENDICES

An understanding of the present invention may also be aided by reference to the appendices, in which:

Appendix A is listings of programming instructions for PALs for use in the illustrated embodiment; and Appendix B is listings of programs for a CPU for use in the illustated embodiment.

DETAILED DESCRIPTION OF THE DRAWINGS

Throughout this description, the preferred embodiment and examples shown should be considered as exemplars, rather than limitations on the apparatus and methods of the present invention. The embodiment of the invention described herein is substantially that of the Enterprise Router, a product of ascom Timeplex, Inc. (Woodcliff Lake, N.J.). The Enterprise Router is available in five-slot (ER-5) and fifteen-slot (ER-15) forms. The user, technical and marketing documentation of the Enterprise Router are incorporated herein by reference.

Introduction

Figure 1:
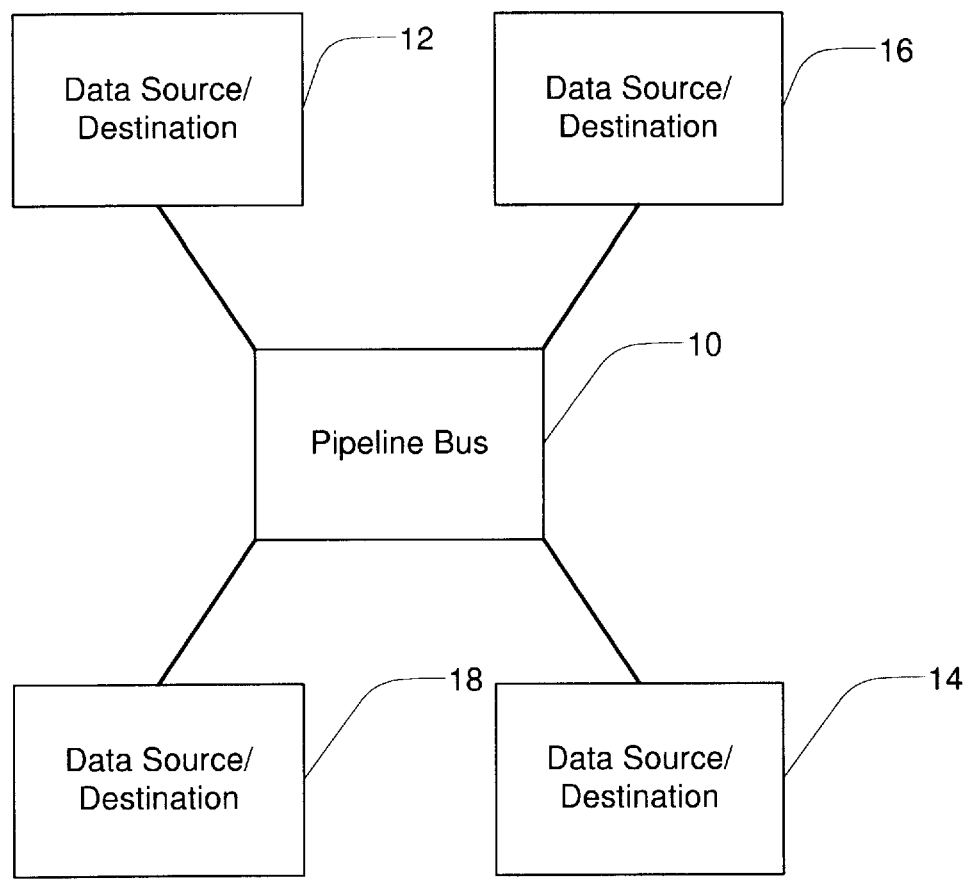
FIG. 1 illustrates a general application of a bus in accordance with the present invention.

A bus structure in accordance with a preferred embodiment of the present invention is indicated generally at 10 in FIG. 1. The bus 10 effectively emulates the functions of a multipoint-crossbar-switch. In other words, the bus 10 permits a data source 12 to be coupled to a data destination 14 at the same time that a data source 16 is coupled to a data destination 18. Data traffic may flow in either direction so that the data destination 14 might also provide a source of data to the data destination 12. The data source/destination elements 12–18 are intended to represent any device or devices that may provide a source of data or a destination for data including but not limited to networks, radio links, transmission lines, routers, bridges, data storage devices, processors and the like. Although the bus 10 is shown being coupled to four source/destination elements, it should also be appreciated that the bus 10 may be coupled to widely varying numbers of devices.

As will be explained in greater detail below, the bus 10, as a result of its unique design, permits multiple channels between different data sources and destinations to coexist on the bus 10 in a virtually simultaneous fashion. Still further, the bus 10 has a very large bandwidth at a relatively low clock frequency. As a result, large amounts of data can be transferred between data sources and destinations over the bus 10 at significantly reduced electromagnetic emanation levels. Thus, the shielding requirements of the bus 10 are substantially simplified. In addition, the unnecessary redundancy of many prior designs has been reduced or eliminated. As a consequence, the cost of construction of the bus 10 is significantly reduced as compared to many prior designs.

One application of the bus 10 is to interconnect processor boards in a multiprocessor environment such as a router for data networks such as local area networks (LAN's) and wide area networks (WAN's). Routers typically interconnect a network to one or more other networks to permit data to be transferred between networks. The router may also perform a bridging function so that different types of networks such as Ethernet, Token Ring, FDDI, ISDN etc. having different protocols and interface requirements can be interconnected together through the router. Other multi-processor applications include computers, hubs, communication switches and data storage arrays.

Figure 2:
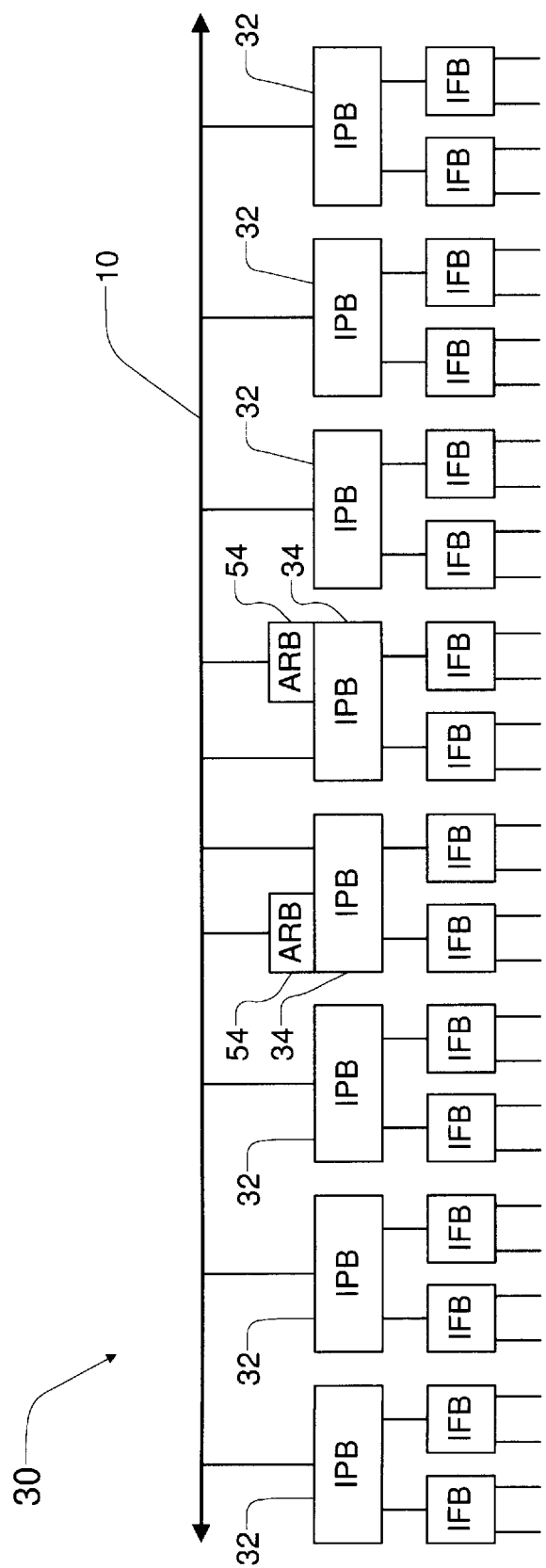
FIG. 2 illustrates a router application of the bus of FIG. 1.

FIG. 2 shows a block diagram of the system architecture of such a router which is indicated generally at 30 in FIG. 2. The router 30 includes a plurality of processor or controller boards 32, 34 which are interconnected by an interprocessor bus (P-bus), the bus 10 of the illustrated embodiment. There are two general types of processors boards, 32 and 34. The processor boards 34 each include a Master Processor Board (MPB) and two network interface boards (IFB). The processor boards 32 each include an Interface Processor Board (IPB) and two network interface boards (IFB). Although the network interface boards (IFB) and their associated MPB or IPB processor boards are depicted functionally as separate, in the preferred embodiment, each pair of network interface boards (IFB) and their associated processor board (MPB) or (IPB) are preferably formed as a single unitary plug-in controller or processor board 32 or 34.

Figure 3:
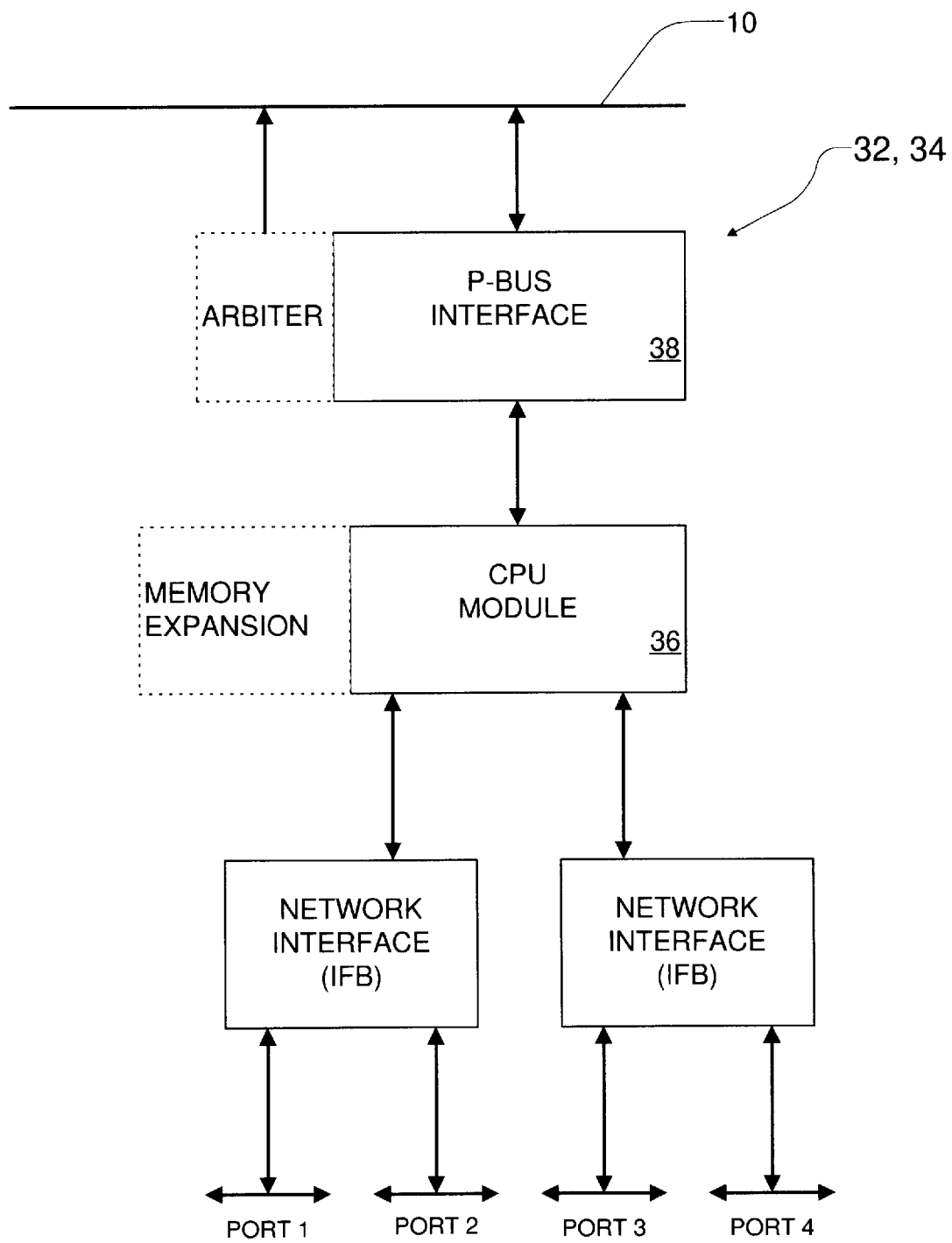
FIG. 3 is a block diagram of a processor board coupled to the bus of the router of FIG. 2.
Figure 4:
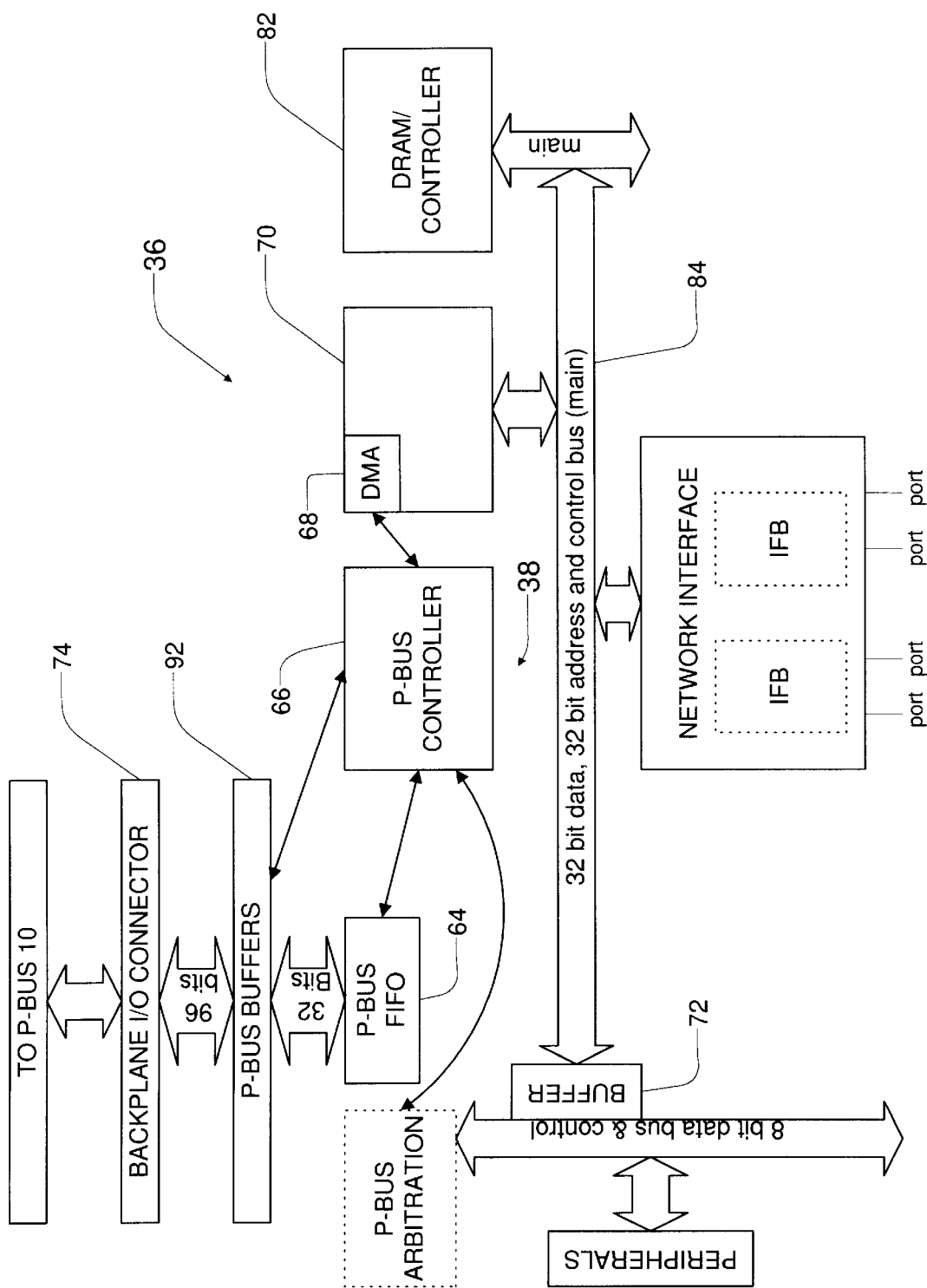
FIG. 4 is a more detailed schematic diagram of the processor board of FIG. 3.

Referring now to FIG. 3, each processor board 32, 34 can be thought of as logically comprising four modules, a CPU processing module 36, an interface module (also referred to as the P-bus interface module) 38 and the two network interface boards or modules (IFB). FIG. 4 is a more detailed schematic diagram of a typical processor board 32, 34.

The plurality of processor boards 32, 34 operate in parallel, communicating with each other across a backplane 35 (FIG. 32) of the P-Bus 10, using a P-Bus command/response protocol. The P-Bus interface module 38 implements the P-Bus command/response protocol to efficiently transmit and receive packets between a buffer memory of the processor board and other processor boards 32, 34.

The CPU module 36 transfers the data between the P-Bus interface module 36 and the network interfaces (IFB). The CPU module 36 contains sufficient program memory to hold all required protocols as well as basic diagnostics. It also contains arbitration circuitry for access to the buffer memory that is shared with the network interface modules (IFB).

The network interface modules (IFB) of each processor board are different for each type of network interface such as—Ethernet, Token Ring, FDDI, ISDN, Serial V.11, Serial V.35, Serial G.703 or HSSI. As noted above, there are two network interface modules (IFB) per processor board 32, 34. Both interface modules (IFB) for a particular processor board are preferably the same type, but this is not a requirement. Each network interface (IFB) contains network controllers to interface with up to two network ports.

Figure 5:
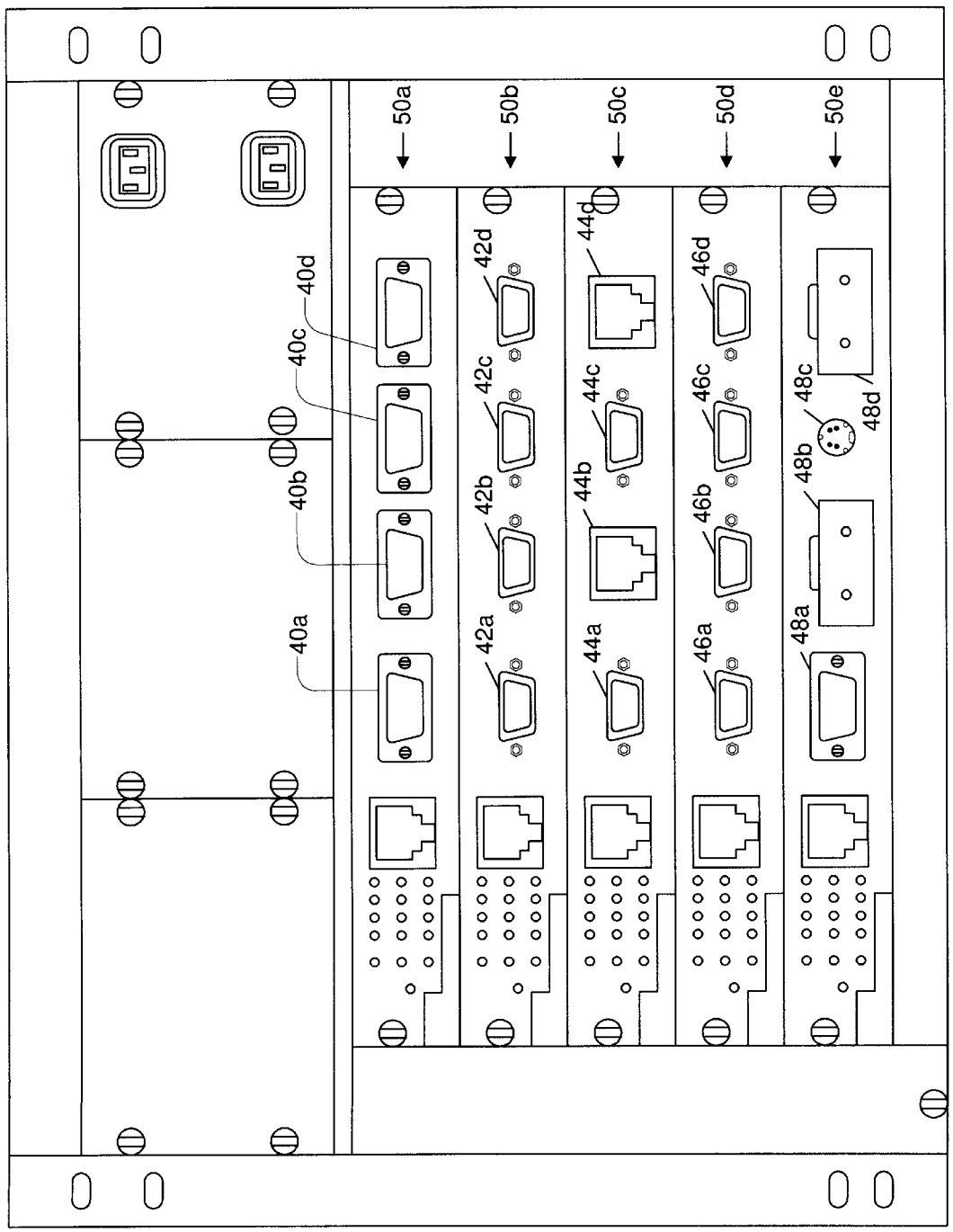
FIG. 5 is a rear view of the chassis of the router of FIG. 2 illustrating network connectors.

FIG. 5 shows the external connectors for the ports of the network interface modules (IFB) of each of the processor boards 32, 34. In the illustrated embodiment, the router 30 has five processor boards 32, 34 each of which has one to four ports. It should be appreciated that the P-bus 10 of the illustrated embodiment may readily accommodate many more processor boards. As shown in FIG. 5, one processor board has four ethernet connectors 40a–40d for the four ports of that processor board. Similarly, the router 30 also has four V.35 connectors 42a–42d, four Token Ring connectors 44a–44d, four Serial V.11 connectors 46a–46d and four FDDI connectors 48a–48d for the remaining ports of the router 30. Of course, interface modules and connectors can be provided for other protocols and other types of data source and data destination devices.

P-Bus 10 Description

The P-Bus 10 is a very high bandwidth bus having improved packet, frame, or cell transfers between peer processor boards. The P-Bus 10 effectively emulates the functions of a multipoint-crossbar-switch. The P-Bus 10 accomplishes this by performing efficient set up and disconnect of high bandwidth transmit-receive channel pairs between boards.

The P-Bus 10 is optimized for efficient low latency channel connect and disconnect. As explained further below, in the illustrated embodiment, the P-Bus 10 provides a scalable bandwidth in increments of 384 Mbits/sec. In the illustrated embodiment, the P-Bus 10 has a total bandwidth of 1.92 Gbits/sec with a fallback capability to ⅔ bandwidth in the event of a bus failure. Of course, other bandwidths will depend upon the particular application.

Each processor board 32, 34 has a high bandwidth transmit channel dynamically allocated to it based on previous bus usage. Actively transmitting processor boards are allocated a greater percentage of the bus bandwidth than inactive boards. Receive channels are negotiated with the command-response protocol between the transmitter and the receiver. The TX/RX channel pair remains in place until the transmission of a single packet, frame or cell is complete.

P-Bus Signals

Figure 6:
FIG. 6 is a table defining the component busses of the bus of FIG. 1.

The signal groups used in the P-Bus 10 are identified in FIG. 6 and explained below.

Figure 32:
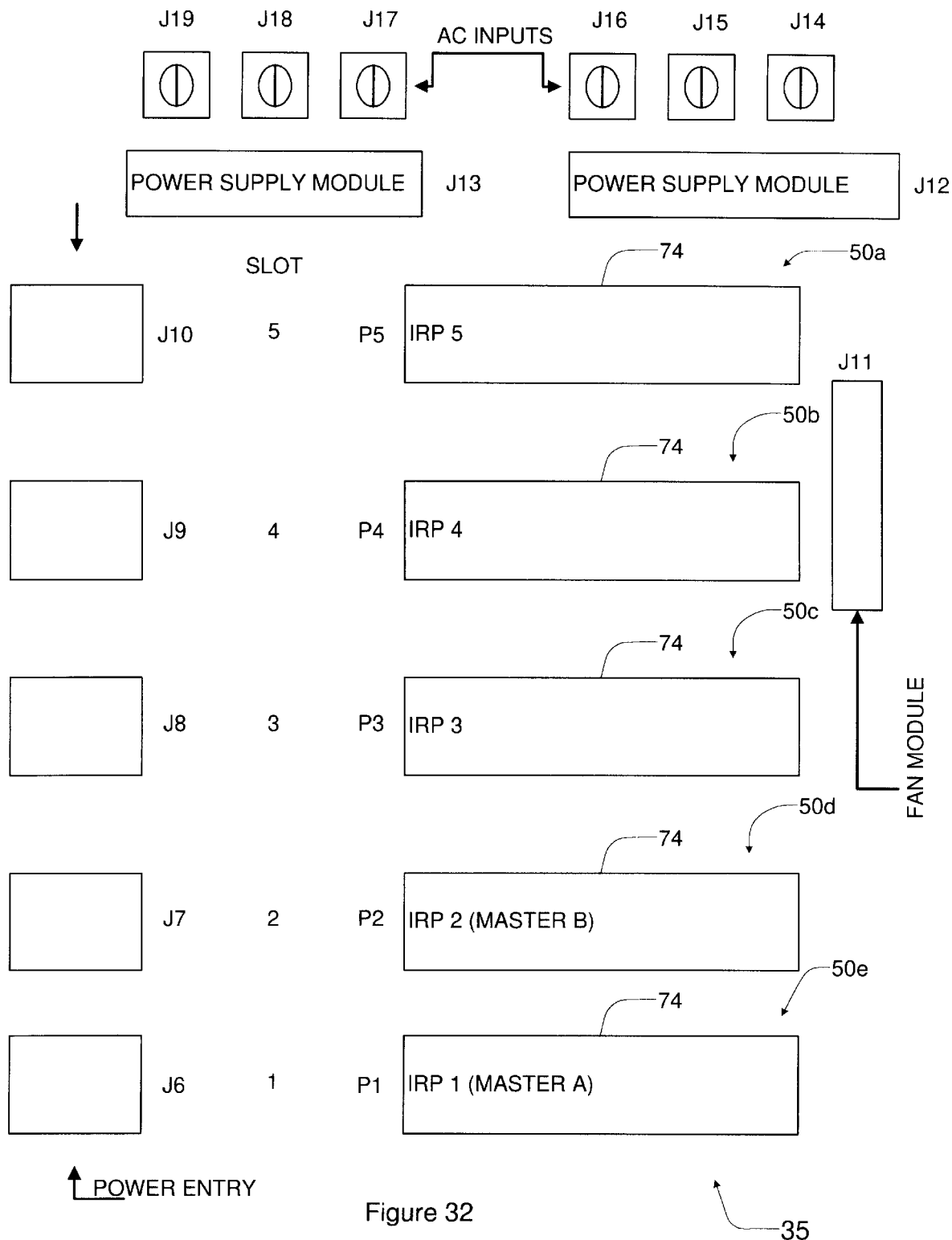
FIG. 32 illustrates a 5 slot backplane of the bus 10 of FIG. 2.

Each processor 32, 34 of the router 30 is physically received in a slot 50a–50e (FIGS. 5, 32). Each slot in turn is hardwired on the backplane 35 (FIG. 32) with a slot identification number from 1 to 5 (up to 15) (GEO[0 . . . 3]). There is no slot 0 in the illustrated embodiment.

To provide redundancy, there are two complete control buses in the P-Bus, Control Bus A and Control Bus B. Each set of Control bus signals includes: a 20 MHz clock from the MPB, a 4-bit ARB bus, a 3-bit CMD bus, a 4-bit ADD bus and a 3-bit RSP bus described below. In addition, the data paths are reconfigurable. A 6-bit Redundancy control bus (P-Bus signal RED[0 . . . 5]) provides the signals for switching between Control buses A and B and for reconfiguring the data paths.

Figure 14:
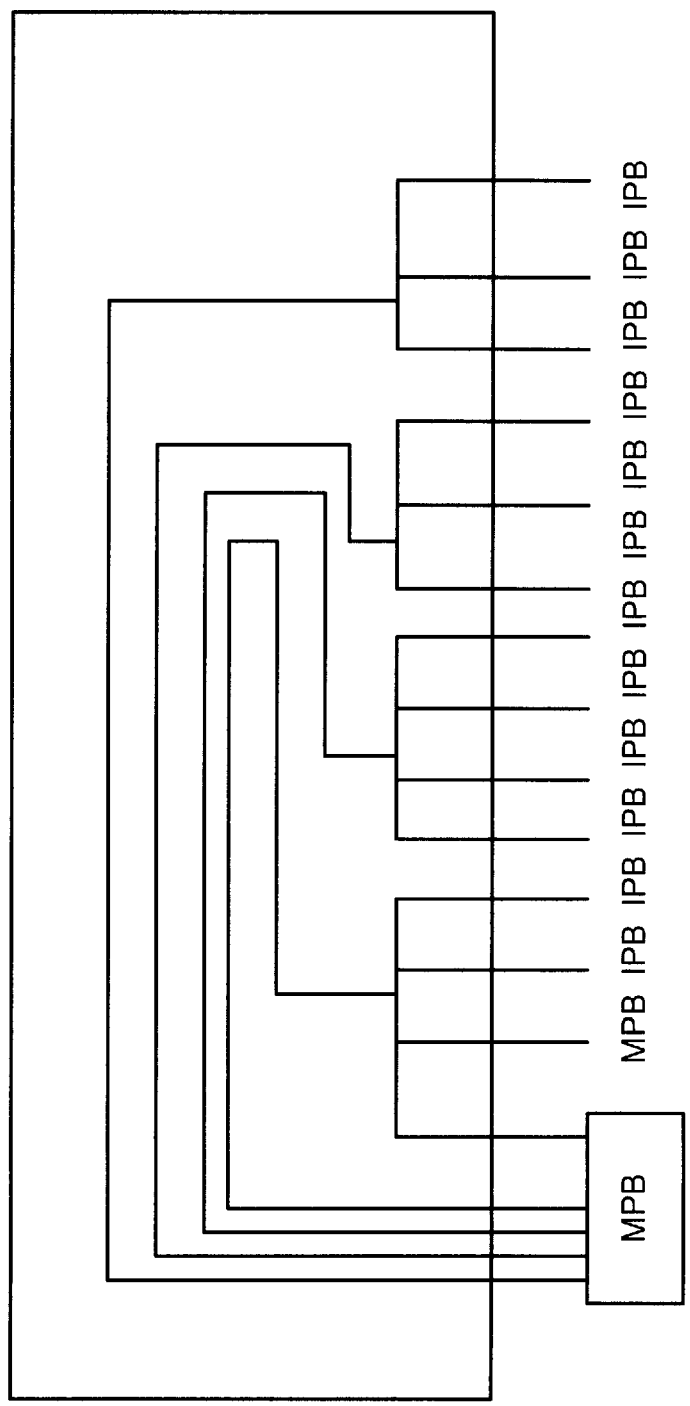
FIG. 14 illustrates the distribution of clock signals for the router of FIG. 2.

The Master Processor Board (MPB) (FIG. 2) generates the 20 MHz clock output signal used by all of the boards in the router chassis. To minimize loading, four copies of this clock output are generated (P-Bus signal OCK[0 . . . 3]), so that each clock drives a maximum of 4 slots. As shown in FIG. 14, the trace lengths of the four clock lines 52 are the same to minimize timing skews. One MPB of the router 30 generates the four clock signals for Control bus A; the other MPB generates the four clocks for Control bus B.

There are three 32-bit data buses: DATAA[0 . . . 31], DATBB[0 . . . 31], and DATAC[0 . . . 31]. Normally all three buses are used together as a 96-bit data bus. If one 32-bit section should fail, the data bus is reconfigured so that the remaining two buses are used together as a 64-bit data bus.

P-Bus Paths

Each P-Bus access requires three clocks cycles to complete in the illustrated embodiment. However, the accesses are pipelined, so that the three clock cycles are overlapped with accesses by other processor boards for effective single clock access. During the first clock cycle a board is selected. During the second clock, the selected board outputs a command and a destination slot number of the destination processor. On the third clock, the transmitting (data source) board sends its data (if any), and the receiving (data destination) board issues its response to the command.

The P-Bus is subdivided into smaller paths so that different processors can access different parts of the P-Bus at the same time. These paths carried on the backplane 35 are listed below.

ARB Bus Arbitration bus—This is a four bit bus that contains the slot number of the board that is allowed to output a command on the next clock. Slot numbers range from 1 to 15. An arbitration controller 54 (FIG. 2) on the MPB generates a selection sequence based on previous bus usage. Active boards get selected more often than idle boards.

CMD Bus Command bus—The command is driven onto this three bit bus by the board that was selected in the previous clock cycle. Details of the allowed commands are given in the section on the Command/Response protocol below.

ADD Bus Address bus—This four bit bus contains the slot number of the board that is the target of the current command.

DAT Bus Data Bus—This 96-bit bus is used only for data transfers. It contains 12 bytes of transmit data being sent to the receiving board.

RSP Bus Response Bus—This three bit bus is driven by the receiving board on the clock following the command. It indicates the receiving board's response to the command. The allowed responses are listed in the section on the Command/Response protocol below.

RED Bus Redundancy Bus—This bus is actually a grouping of signals used to implement bus switching for redundancy. It consists of two signals (RED1, RED0) used to select among redundant data paths, and three signals (RED4,RED3,RED2) used to switch between two sets of control paths. A sixth redundancy bit (RED5) is reserved for future enhancements.

Command/Resoonse Protocol

The P-Bus uses a Command/Response protocol (CRP) to manage data transfers between processor boards. The CRP allows processors to set up transmit/receive channel pairs, signal that new data is available, acknowledge receipt of data, and break down transmit/receive channel pairs. In addition, the active MPB can command any other processor board to reset itself.

In the illustrated embodiment, each P-Bus access requires 3 clock cycles to complete, plus a minimum of two more clock cycles to set up for the next transfer. However, these clock cycles overlap with accesses by other boards, so that each access effectively requires only one clock. It is apparent, of course, that a protocol may be selected having greater or fewer clock cycles per access.

For example, if a greater number of clock cycles per access is selected, a greater number of processor slots may be in communication during an access.

When a processor board must transmit to another processor board, it negotiates with the receiving board to set up a transmit/receive channel. Once this channel is set up, it is maintained until the entire data frame or cell has been transmitted. The channel is then immediately broken. The following list describes the commands and responses used by the CRP. The 3-bit code for each command and response is shown, but note that this code is inverted for transmission along the P-Bus backplane.

Commands

All commands are driven onto the CMD bus in the clock cycle following an address match with the ARB bus. (An address match occurs when the transmitting board's own slot number and the current sequence number on the ARB bus are the same at the rising edge of the clock.) The slot number of the target of the command is driven onto the ADD bus while the command is on the CMD bus. During the next clock cycle after the command is issued, the transmitted data is sent on the DAT bus and the response to the command is expected on the RSP bus.

| BITCODE | NAME | DESCRIPTION |
|---|---|---|
| 011 | CHREQ | Request Channel - Generated when a board wants to open a transmit/receive channel with another board. Valid responses:<br>ACKCH  The receiving board accepts the connection and a transmit/receive channel is considered to be set up between the two boards.<br>NAK  The receiving board is unable to setup a channel at this time.<br>EMPTY  There is no board in the targeted slot. |
| 110 | DAV | Data Available - Issued by the transmitting board to indicate that valid data will be placed on the DAT bus at the next clock cycle. Valid responses:<br>ACK  The transmitted data will be accepted.<br>NAK  The transmitted data will not be accepted because of receiver congestion.<br>EMPTY  The target board has been unplugged. |
| 101 | LDAV | Last Data Available - Issued by the transmitting board to indicate that valid data will be placed on the DAT bus at the next clock cycle, and it will be the last of the data for this channel connection. Valid responses: |

-continued

| BITCODE | NAME | DESCRIPTION |
|---|---|---|
| | | ACK  The transmitted data will be accepted and the TX/RX channel between the two boards will be disconnected.<br>NAK  The transmitted data will not be accepted because of receiver congestion. The TX/RX channel remains in place.<br>EMPTY  The target board has been unplugged. |
| 000 | NOP | No Operation - Generated by the transmitting board when it has set up a Transmit/Receive channel, but new data is not yet ready. The data on the DAT bus after the next clock is indeterminate. Valid responses:<br>ACK  The receiver recognizes that the transmitter is busy and awaits further data.<br>DISC  The receiver NOP counter has timed out. The receiver has severed the TX/RX channel between the two boards.<br>EMPTY  The target board has been unplugged. Note that the bit code for a NOP command is inverted to 111 on the CMD bus, which is the same as if the bus were floating. This means that if an empty slot is selected, it will generate a NOP command with a target address (floating) of 1111 on the ADD bus, corresponding to non-existent slot 0. |
| 111 | BRST | Board Reset - Generated only by the active MPB to force an apparently non-functional board to reset itself. Valid responses:<br>ACK  The Reset command has been recognized by the target processor board and a reset is in progress.<br>EMPTY  The target board has been unplugged or the target's P-BUS controller is not functioning. |

Responses

When the target of a command recognizes its slot number on the ADD bus, it drives its response to the command onto the RSP bus on the next clock.

| BITCODE | NAME | DESCRIPTION |
|---|---|---|
| 111 | ACKCH | Acknowledge CHREQ - Indicates that the CHREQ command is accepted and a TX/RX channel pair has been set up. The responder is now ready to receive data. |
| 011 | ACK | Acknowledge - Indicates that the command was accepted. This is a valid response for the following commands:<br>DAV  The data on the DAT bus is accepted.<br>LDAV  The data on the DAT bus is accepted and the TX/RX channel between the two boards no longer exists.<br>NOP  The receiver recognizes that the transmitter is busy. The receiver will continue to wait for more data.<br>BRST  The P-Bus controller is alive and recognizes the Reset command. Reset is in progress. |
| 110 | NAK | Negative Acknowledge - Issued in response to a command when the receiver is experiencing congestion or is otherwise unable to handle the command. This response is valid for the following commands:<br>CHREQ  The receiver cannot set up a channel at this time, most likely because it has already set up a channel with another board.<br>DAV  The receiver cannot accept the transmitted data because it has not finished storing the previous data. |

-continued

| BITCODE | NAME | DESCRIPTION |
|---|---|---|
| | LDAV | The receiver cannot accept the transmitted data because it has not finished storing the previous data. The channel connection remains in effect. |
| 101 | DISC | Disconnect - Issued only in response to a series of NOP commands. It indicates that the last NOP command exceeded the maximum allowed, so the receiver is severing the TX/RX channel connection. |
| 000 | EMPTY | Empty Slot - This response corresponds to a floating RSP bus and indicates an empty slot. |

Dynamic Bandwidth Allocation

The Arbitration daughter board 54 (FIG. 2) on the MPB is responsible for continuously generating the sequence numbers for the ARB bus. The sequences are configured dynamically based on monitoring the CMD and RSP buses. The Arbitration board 54 keeps track of the boards that actively transmitted a command (as opposed to the default NOP) when their slot was last selected on the ARB bus. These are considered to be the active boards for the next selection cycle.

Error Recovery

The Command/Response protocol includes procedures for recovering from error conditions. Errors could occur because of a board being unplugged, glitches in the power or a hardware failure on one of the boards.

After a transmit/receive channel is set up, the receiver expects to receive data from the transmitter. If the transmit data is not ready, a NOP command is received instead of DAV. The receiver keeps count of consecutive NOPs from the transmitter. If the NOP count reaches 32, the receiver returns a disconnect (DISC) response to the transmitter and breaks the connection between the two boards.

To protect against a completely dead transmitter, the receiver also contains a watchdog timer which monitors the times between consecutive received commands. After a channel is established, if a new command is not received within 25 µs, the receiver disconnects from the channel.

When the transmitter sends data to another board, it expects an ACK or NAK response. However, if the transmitter receives 32 consecutive NAK responses, it assumes the receiver is no longer operating and disconnects from it. (An EMPTY response is treated the same as a NAK response.) If the receiver was just extremely busy, it will also disconnect from the link when its watchdog timer times out.

Examples

During each clock cycle one processor board is driving the CMD/ADD buses, another board may be driving data on the DAT bus and a third board may be responding on the RSP bus to an earlier command, while a fourth board is being selected by the ARB bus to transmit on the next clock. An example of this pipelined use of the P-Bus is shown in FIG. 8 and explained below.

FIG. 8 is a snapshot of P-Bus activity from clock 17 to clock 26. Not shown is the activity before t17 and after t26. Selected parts of the table are explained in the following paragraphs.

Slot 4 Activity

FIG. 9 highlights the portion of Table 2 that involves activity by the processor board in slot 4 only.

At clock t17, the Arbiter board 54 selects slot 4 on the ARB (arbitration) bus. At the next clock (t18), slot 4, that is, the processor board in slot 4, issues a CHREQ (channel request) command to slot 7. At clock t19, the processor board in slot 7 responds with ACKCH to acknowledge the channel connection request and confirm that a TX/RX channel has been set up between slot 4 and slot 7. There is no accompanying data for a CHREQ.

Slot 4 is selected again at clock t22. At the following clock (t23), the processor of slot 4 issues a DAV (data available) command to slot 7. At clock t24, the processor board of slot 4 sends the first packet of data (D0) and the processor board of slot 7 issues ACK (acknowledge) to indicate that it will accept the data.

Slot 5 Activity

FIG. 10 highlights the portion of FIG. 8 that involves activity by slot 5 only.

At clock t18, slot 5 is selected by the ARB bus. At clock t19 it sends a DAV (data available) command to slot 3, and at t20 it places its data packet number 511 on the DAT (data) bus. However, slot 3 sends a NAK response at t20, indicating that it is not ready to accept the data on the DAT bus. Therefore, when slot 5 is selected again at clock t23, it repeats data packet D511 at clock t25. This time an ACK (acknowledge) response is received from slot 3.

Slot 6 Activity

FIG. 11 highlights the portion of FIG. 9 that involves activity by slot 6 only.

Slot 6 is selected on the ARB bus at clock t19. At clock t20, it issues a DAV (data available) to slot 2. At t21 it sends its data packet (D62 in this example), while slot 2 acknowledges the data by issuing the ACK response.

Slot 6 is next selected at clock t24. At clock t25, it issues an LDAV command to slot 2, indicating that it is sending its last data packet. At clock t26, slot 6 sends that last data packet while slot 2 acknowledges (ACK) the command, and the connection between slot 6 and slot 2 is broken.

P-Bus Activity for Slots 4 to 6

FIG. 12 shows how the activity for slots 4, 5, and 6 are pipelined so that they are all using different parts of the P-Bus 10 at the same time. By overlapping P-Bus activity, each slot has an effective access time of 1 clock (50 ns).

Other Slot Activity

FIG. 13 shows the remaining activity on the P-Bus during the time period shown in FIG. 8.

At clock t20 the ARB bus selects slot 7, which is already busy listening to slot 4. Therefore, slot 7 puts out no command at clock t21, which is pulled up on the backplane 35 to become a NOP command to non-existent slot 0. On the following clock (t22), no one drives the RSP bus, producing the default EMPTY response of a floating bus.

In this particular sequence, slot 7 is normally selected after slot 6. However, since slot 7 issued a NOP when it was selected at clock t20, it is no longer considered active by the Arbitration board 54. Therefore, the dynamic bandwidth allocation algorithm substitutes a new slot (slot 8) to be selected after slot 6 at clock t25. Since slot 8 is busy listening to slot 1, the command from slot 8 at t26 is also a NOP, so another slot number will be substituted after slot 6 on the next cycle.

When all the pipelined activity is superimposed on the same table, the result is the constant bus activity shown in FIG. 8 which is repeated in FIG. 29 with shading to show the overlapping P-Bus accesses. It should be appreciated that the particular sequence of the components of the access by each channel can be modified as appropriate. For example, although an acknowledgement is shown taking place in the same cycle as the data transmission of the channel, it is recognized that the acknowledgment can occur in another cycle of the access.

P-Bus Interface

All Processor Boards 32, 34 have a P-Bus Interface 38 (FIG. 4) to interface with the P-Bus 10 (FIG. 2) to communicate with other boards in the system. Interface Processor Boards (IPB) and Master Processor Boards (MPB) use virtually the same P-Bus interface 38. However, only the MPB has an Arbiter daughter board 54 which generates the slot sequence numbers on the ARB bus.

Memory Control

The P-Bus data buses interface with the main memory 82 on the Processor board through a bidirectional FIFO 64, using Direct Memory Access (DMA) control. A DMA state machine provided by a P-Bus Controller 66 generates the requests to the DMA controller 68 inside the i960 processor for transfers to and from the FIFO 64. Two megabytes of RAM are available for P-Bus Buffers 82.

The FIFO 64 can also be written and read directly by the CPU 70. In addition, all handshake control and status bits for the FIFO are accessible by the CPU. Therefore, all DMA transfers to and from the P-Bus can be simulated by equivalent transfers under direct CPU control.

P-Bus Control

Two state machines of the P-Bus Controller 66 provide for the control of the interface between the bidirectional FIFO 64 and the P-Bus 10. A Transmit State Machine processes commands and data being sent to the P-Bus. A Receive State Machine processes commands and data being received from the P-Bus, and returns appropriate responses.

Transmit State Machine

The transmit state machine of the P-Bus Controller 66 controls the transmission of packets onto the P-Bus. This hardware controls the transmit-receive channel pair negotiation, data transmission and retransmission, and error handling.

When a frame transmission is started, the Transmit State Machine first sets up a channel by issuing a CHREQ command to the target processor. Commands are issued only when the address on the ARB bus matches the sender's slot number GE00-3. If the target slot is empty, the transmission is immediately aborted. Otherwise, the state machine will continue to send CHREQ commands until an ACKCH response is received or a timeout occurs because of the number of NAKs (no acknowledgements) has exceeded a predetermined limit.

Once the channel has been set up, the data is transferred to the target (destination processor) in 96-bit bursts (assuming all data paths are working) using DAV commands and waiting for ACK responses. If data from the FIFO 64 is not yet ready when the sender'lot is selected by the Arbiter, a NOP command is substituted for the DAV command. When the last byte of data is sent along with an LDAV command, the ACK response causes the Transmit State Machine to return to its IDLE state.

Receive State Machine

The Receive State Machine of the P-Bus Controller 66 controls the reception of packets from the P-Bus. This hardware controls the transmit-receive channel pair negotiation, data reception and acknowledgement, and error handling. After the receiver processor board 32, 34 is started, the state machine monitors the P-Bus, waiting for a CHREQ command for this board's address. When the channel request is received, the state machine responds with an ACKCH to acknowledge the channel setup. When a channel has been set up, data transfer commands (DAV,LDAV) received for this address are acknowledged (ACK) if space is available in the FIFO 64 for storing the received data. If a NOP command is received for this address and the maximum NOP count is not exceeded, the state machine also responds with an ACK and increments the NOP counter. Otherwise the state machine responds with a NAK. After the Receive State Machine responds with an ACK to an LDAV command, it returns to the IDLE state.

Data Flows

In the following discussion, data flow within a data source device is first described, followed by data flow within a data destination device. However, where a data source device and data destination device are combined, the corresponding state machines, connection lines, and similar elements are preferably combined correspondingly.

Tx Data Flow

Figure 16:
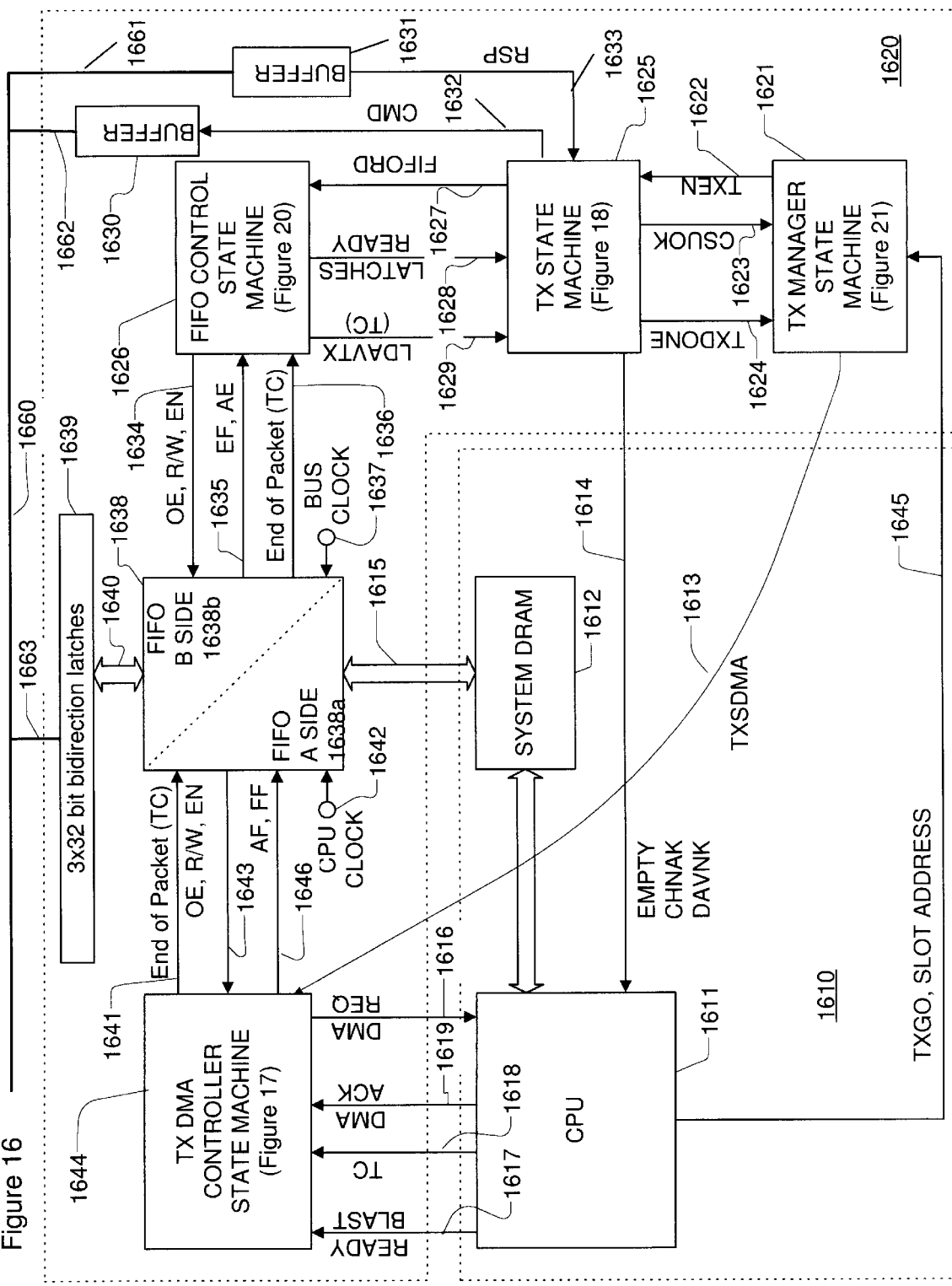
FIG. 16 is a data flow diagram of data transmission from a data source device to a bus in accordance with the present invention.

Referring now to FIG. 16, there is shown a data flow diagram for data transmission from a data source device to a backplane 1660. The data source device includes an interface circuit 1620 and a processor circuit 1610. The interface circuit 1620 and the processor circuit 1610 are a portion of the P-Bus interface 38 and the CPU module 36, respectively, of FIG. 4. The interface circuit 1620 and the processing circuit are connected by and communicate through several lines 1613–1619. In FIG. 16, the bus (the P-Bus 10 of FIG. 2) is considered to comprise the backplane 1660, the interface circuit 1620 and several connecting lines 1661–1663.

The processor circuit 1610 comprises a CPU 1611 and a memory 1612. The CPU 1611 and memory 1612 are preferably coupled via a bus for high speed transfers. The CPU 1611 is preferably an Intel Corporation (San Jose, Calif.) i960 microprocessor (the CPU 20 of FIG. 4) having an on-chip DMA controller (not shown). Data transfers to the interface circuit 1620 come from the CPU 1611. Preferably, these data transfers are made in a number of packets, and the CPU maintains a count of the number of the number of packets to transfer. In the disclosed embodiment, where the data source device comprises a processor board, the processor circuit includes system DRAM (see DRAM 82 of FIG. 4), and the memory 1612 comprises the system DRAM. The processor circuit 1610 further comprises a CPU clock 1642 which provides timing signals to the various components of the processor circuit 1610.

The backplane 1660 of the P-Bus 10 includes a data bus portion (DAT) 1663, a command bus portion (CMD) 1662 and a response bus portion (RSP) 1661. The data bus portion 1663 is coupled to the interface circuit 1620 for moving data from the interface circuit 1620 to the data destination devices. The command bus portion 1662 is coupled to the interface circuit 1620 for moving command messages from the interface circuit 1620 to the data destination devices and the arbitration circuit. The response bus portion 1661 is coupled to the interface circuit 1620 for moving response messages from the data destination devices to the interface circuit 1620.

The interface circuit 1620 comprises 8 elements: a DMA transmit controller state machine (DMASM) 1644, a FIFO 1638, a FIFO Control state machine (FIFOSM) 1626, a Transmit state machine (TXSM) 1625, a Transmit Manager state machine (TXMSM) 1621, a command bus buffer 1630, a response bus buffer 1631, and a latch 1639. Each of these state machines is implemented by the P-Bus controller 66 (FIG. 4). The interface circuit 1620 includes the interconnections of these elements 1640, 1634–1636, 1627–1629, 1622–1624, 1632–1633, 1641, 1643, 1646, and a clock line 1637 which is received from the backplane 1660. The state machines 1644, 1626, 1625 and 1621 preferably are embodied as one or more programmable logic devices (e.g., PLAs or PLDs), and this may be accomplished using the PLA programs set forth in Appendix A.

The FIFO 1638 (FIFO 64 in FIG. 4) has an A-side 1638a and a B-side 1638b. In data source devices, the FIFO need only be able to move data from the Aside 1638*a* to the B-side 1638*b*. However, if a data source device is also a data destination device, the FIFO is preferably bi-directional. Preferably, the size of the FIFO's A-side 1638*a* is large enough to accommodate high speed data transfers from the processor circuit 1610. Thus, in the disclosed embodiment, the FIFO 1638 is 32-bits wide to accommodate the 128-bit (4×32 bits) burst transfer mode of the i960.

The latch 1639 preferably is adapted to the width of the data bus and the FIFO 1638. In the disclosed embodiment, wherein the data bus is 96 bits wide, the latch comprises three 32-bit latches, referred to herein as A, B and C. The FIFO's B-side 1638*b* includes a switching circuit to switch the output of the FIFO 1638 to each of the three latches 1639.

The interface circuit 1620 can be divided into two logical sections: a processor side and a backplane side. The processor side comprises the DMASM 1644, the FIFO's A-side 1638*a* and the interconnecting lines 1641, 1643, 1646. The backplane side comprises the FIFO's B-side 1638*b*, the FIFOSM 1626, the TxSM 1625, the TxMSM 1621, the latches 1639, the buffers 1630, 1631, and their interconnections 1640,1634–1636, 1627–1629, 1622–1624, 1632–1633, and operates according to a clock 1642 generated by the processor circuit 1610. The processor side sets up memory transfers between the interface circuit 1620 and the processor circuit 1610. The backplane side is more complex, fulfills the bus protocol as used on the backplane 1660, and manages data transfers from the interface circuit 1620 to the backplane 1660. Accordingly, after the backplane side sets up a data channel, the processor side and backplane side alternate between the processor side filling the FIFO 1638 and the backplane side emptying the FIFO 1638. Because the backplane 1660 and the processor circuit 1610 have independent clocks 1637, 1642, the interface circuit 1620 also synchronizes handshaking signals between the processor side and the backplane side.

As explained above, the primary function of the bus is to move data of various sizes between data source devices and data destination devices. In the disclosed embodiment, this function is accomplished by moving data (1) from the data source device's memory 1612 (e.g., system DRAM) into the data source device's FIFO 1638, (2) from the data source's FIFO 1638 over the data portion 1663 of the backplane 1660 into the data destination device's FIFO, and (3) finally from the data destination device's FIFO to the data destination device's memory (e.g., system DRAM).

The Backplane Side of the Interface Circuit

TxMSM

The processor circuit 1610 indicates when there is data to be transferred to a desired data destination device by asserting a Transmit Go line (TXGO) 1645 to the TxMSM 1621. Based upon TXGO, the TxMSM 1621 signals other elements in the interface circuit 1620.

The CPU 1611 asserts TXGO 1645 if the CPU 1611 has initialized its DMA channel for packet transfer over the P-Bus. In the disclosed embodiment, this initialization is performed by the program included in Appendix B. Each channel is preferably initialized (by the device driver) with a pointer to a buffer located in the memory 1612, a byte count (which is used to generate TC) and a variable indicating the type of transfer (quad fly-by in the disclosed embodiment). The CPU 1611 also determines the destination slot address, and in the disclosed embodiment stores the destination slot address in a command register. TXGO 1645 also indicates that the command register contains the destination slot address.

The TxMSM 1621 is coupled to the TxSM 1625 via a Transmit Enable line (TXEN) 1622, a Channel Setup OK line (CSUOK) 1623 and a Transmit Done line (TXDONE) 1624. The TxMSM asserts TXEN 1622 to signal that transmitting may begin. The TxSM 1625 asserts CSUOK 1623 to signal that a channel to the data destination device has been established. The TXSM 1625 asserts TXDONE 2124 to signal that transmission of data to the data destination device is complete.

The TxMSM 1621 is also coupled to the DMASM 1644 via a Transmit Start DMA line (TxSDMA) 1613. TxSDMA 1613 signals that the DMASM should move data from the processor circuit 1610 into the FIFO 1638.

Figure 21:
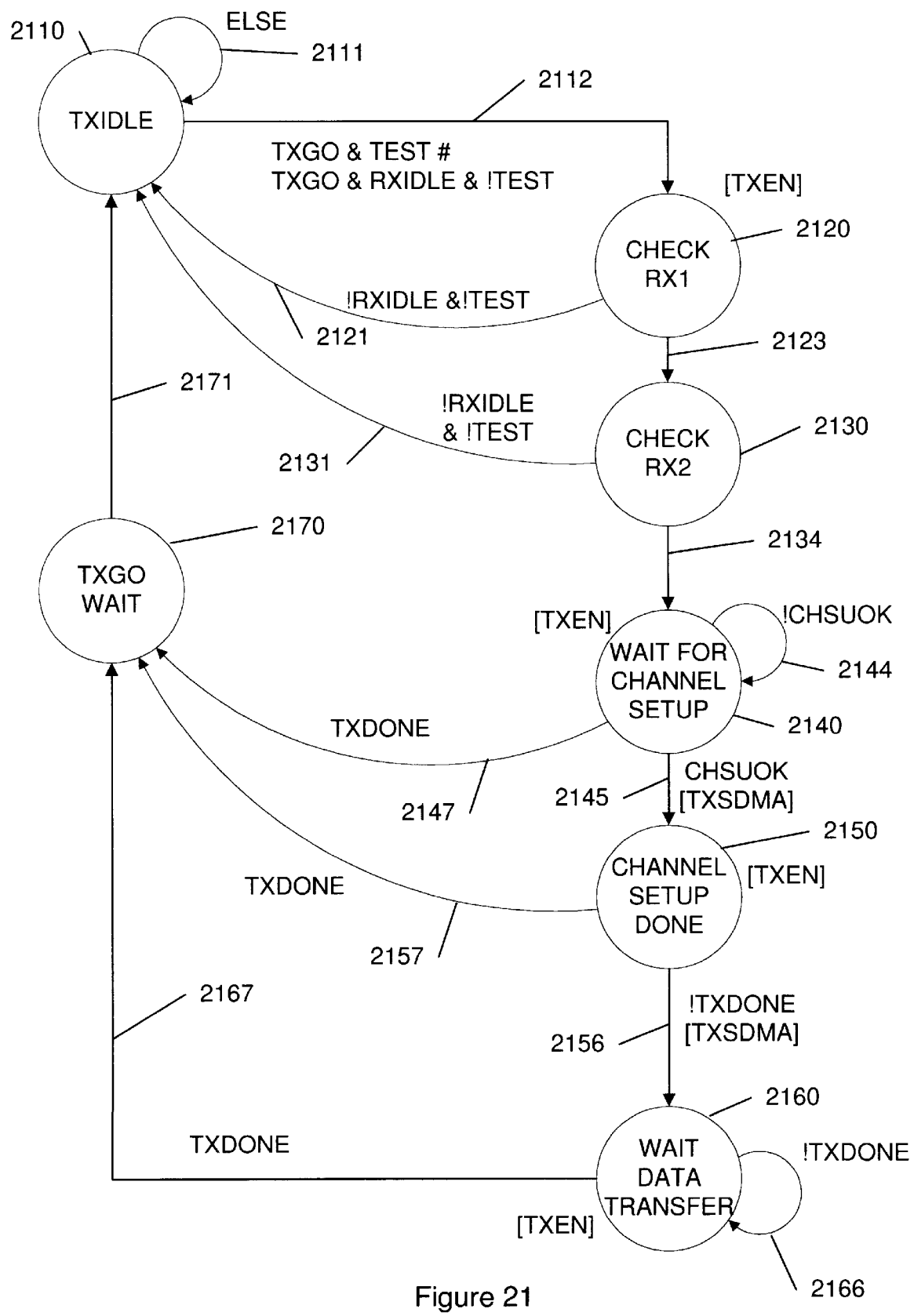
FIG. 21 is a state diagram of a bus manager state machine in the data source device of FIG. 16.

Referring now to FIG. 21, there is shown a state diagram of the TxMSM 1621. FIG. 21 also includes information respecting the incorporation of testing features in the TxMSM 1621. For clarity, this discussion does not address the testing in depth.

The TxMSM 1621 initializes into an Idle state (TXIDLE) 2110. When the processor circuit 1610 asserts TXGO 1645 (2112), the TxMSM 1621 transitions to the Check Receive Once state (CHECK RX 1) 2120. If the data source device is also capable of receiving data (i.e., it is also a data communications device), and packets are being received (!RXIDLE), then the TxMSM transitions back to TXIDLE 2110 (2121). Otherwise, the TxMSM 1621 asserts TXEN 1622. If a packet reception is in progress by such a data communication device, then TXGO 1645 remains pending and packet transmission starts as soon as the packet reception is done (RXIDLE). Preferably, the TXMSM 1621 checks RXIDLE a second time in a CHECK RX2 state 2130, and forces TXIDLE 2110 if packet reception is in progress.

If packet reception is not in progress (2134), then the TXMSM enters a Wait for Channel Setup state 2140. In this state 2140, and until transmission is complete, TXEN remains asserted. TXEN 1622 allows the TxSM 1625 to start a channel setup process to the destination slot number. In Wait for Channel Setup 2140, the TxMSM 2121 waits for the CHSUOK signal (2144). Channel setup and the operation of the TXSM is described below. However, if there is an error during channel setup, the TxSm asserts TXDONE 1624 (2147), and the TxMSM 1621 enters a Transmission Go Wait state (TXGO WAIT) 2170. From TXGO WAIT 2170, the TxMSM 1621 transitions 2171 to TXIDLE 2110.

When CHSUOK is asserted (by the TxSM 1625) 2145, the TxMSM 1621 asserts TxSDMA 1613, and enters a Channel Setup Done state 2150. At this time the TxMSM 1621 asserts TXSDMA 1613 to start the transfer of data from the memory 1612 to the FIFO 1638. This primes the FIFO 1638 with data, to increase speed.

If the transfer of data is complete, the TxSM 1625 asserts TXDONE and the TXMSM transition to the TXGO WAIT state 2170. Othewise, the TxMSM 1621 transitions to the Wait Data Transfer state 2160. In this state, the TxMSM 1621 awaits TXDONE 1624 (2166). When the data transmission over the bus is complete, the TxSM 1625 asserts TXDONE 1624 (2167), and the TxMSM 1621 transitions to TXGO WAIT 2170 to await another data transfer initiated by the software devices (TXGO active).

TxSM

As shown in FIG. 16, the TXSM 1625 interfaces between the FIFO 1638 and the backplane 1660. The TxSM 1625 processes commands and controls data being sent to the backplane 1660. To coordinate activity on the backplane side with that on the processor side, the TXSM 1625 is coupled to the DMASM 1644 via a Transmit Status line (TXSTATUS) 1614. As described below, TXSTATUS 1614 provides a number of different status messages. The TxSM 1625 is coupled to the FIFOSM 1626 via a Last Data Available to Transmit line (LDAVTX) 1629, a Transmit Latches Ready line (TXLRDY) 1628 and a FIFO Read line (FIFORD) 1627. The TxSM 1625 asserts FIFORD to signal that the FIFO 1638 should be read, pushing data from the FIFO 1638 to the latch 1639. The FIFOSM 1626 asserts TXLRDY 1628 to indicate that the latch 1639 is available to receive data from the FIFO 1638. The FIFOSM 1626 asserts LDAVTX 1629 when the last data available to transmit has been stored in the FIFO 1628a. LDAVTX 1629 is also referred to as "TC".

In addition, the TxSM 1625 is coupled to the command buffer 1630 via line 1632 and the response buffer 1631 via line 1633. From these couplings, the TXSM 1625 can send command messages on the command portion (CMD) of the backplane and read response messages on the response portion (RSP) of the backplane.

Figure 18:
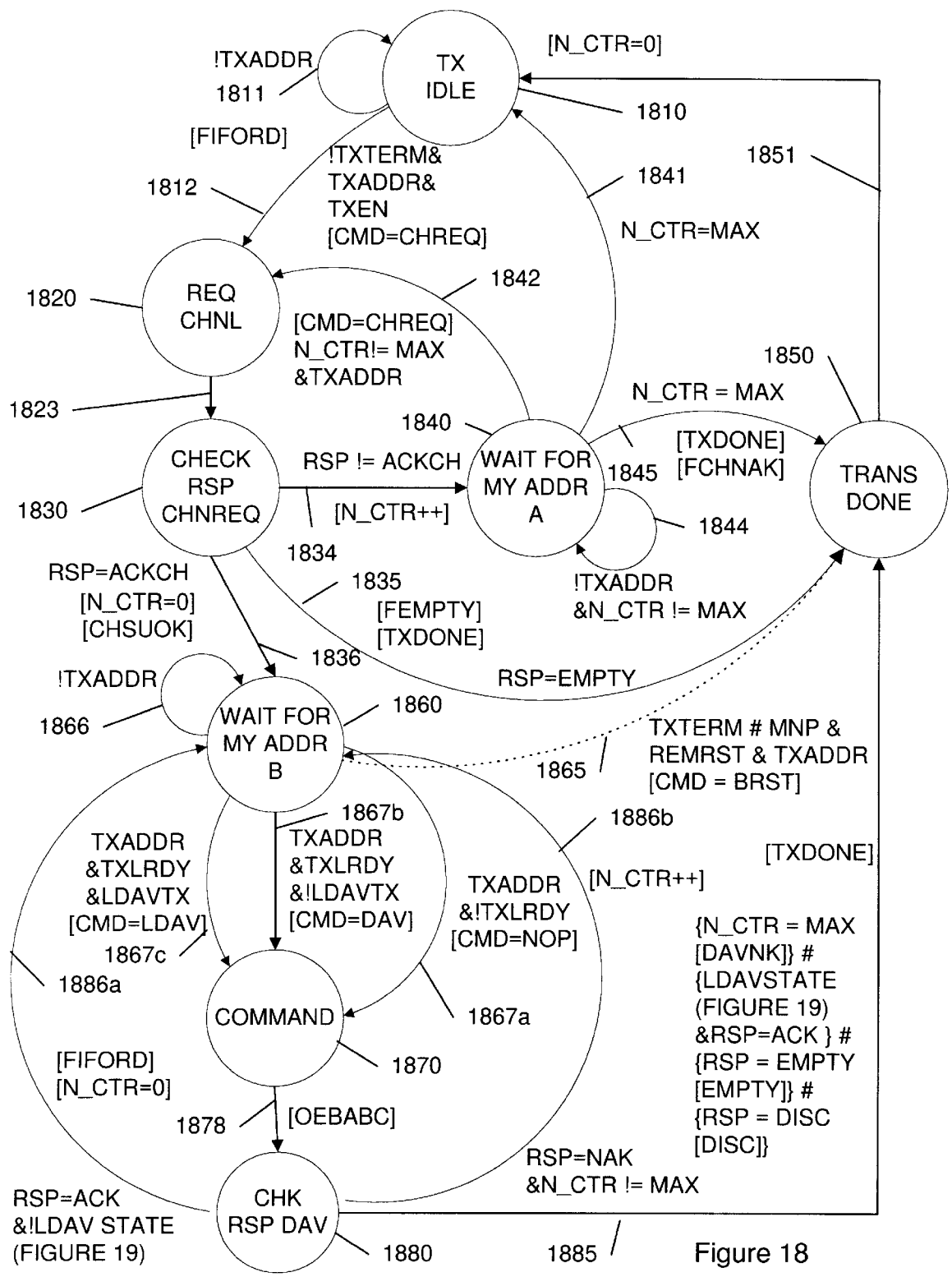
FIG. 18 is a state diagram of a transmit state machine in the data source device of FIG. 16.
Figure 19:
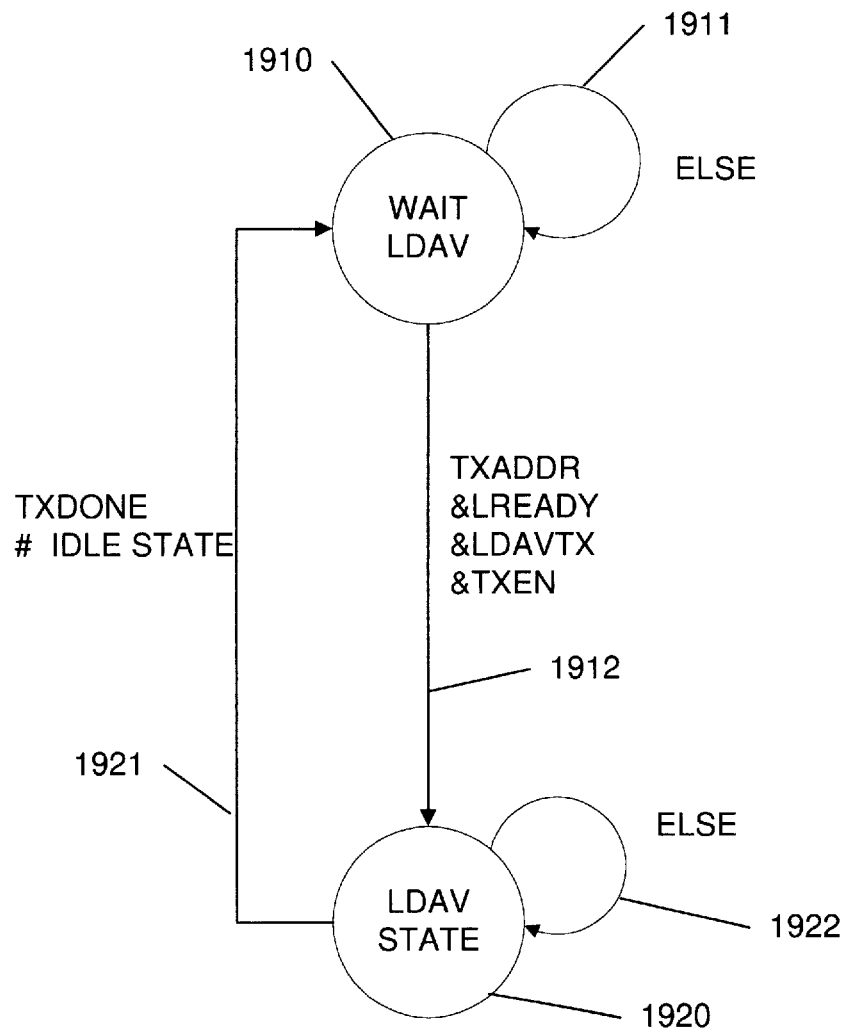
FIG. 19 is a state diagram of a detail of part of the decision making in the state diagram of FIG. 18.

Referring now to FIG. 18, there is shown a state diagram of the TxSM 1625. The TxSM 1625 is initially in an idle state (TX IDLE) 1810. In TX IDLE 1810, the TxSM 1625 waits for its own slot address (to identify it as the data source device selected by the arbitration board) to appear on the arbitration bus (TXADDR) 1811, and resets an error counter N_CTR. As will be seen, when N_CTR reaches a predefined maximum (MAX), the TxSM recognizes this as an error condition. Upon TXEN 1622 (1812) asserted by the TxMSM 1621, the TXSM 1625 transitions to a Channel Request state (REQ CHNL) 1820 and sets up and stores a channel request message (CHREQ—011b) in the command buffer 1630. The slot address of the desired data destination device is also set up and sent. Next, the TxSM 1625 transitions to a Check Response to the Channel Request state (Check RSP CHNREQ) 1830. In this state 1830, the TXSM 1625 reads the response message from the response buffer 1631 which was sent by the addressed data destination device.

A data destination device may either accept (ACKCH) or reject (NAK) a channel request. In case of a NAK response (1834), the TxSM 1625 retries (preferably up to 32 more times) to establish a connection. This is accomplished by incrementing N-CTR and transition to the Wait for my Address A state 1840. In this state 1840, the TxSM 1625 waits for TXADDR (1844). If the slot address is present, and the maximum number of retries has not been reached (N_CTR !=MAX) 1842, then the TxSM 1625 retries the CHREQ command and transitions back to REQ CHNL 1820. However, if a connection cannot be established (i.e., N_CTR=MAX), the TXSM 1625 asserts TXDONE 1624 (1845), and transitions to a Transmission Done state (TRANS DONE) 1850. The TxSM 1625 also sets TXSTATUS 1614 to Channel-not-available (CHNAK). From TRANS DONE 1850, the TXSM 1625 transitions (1851) to TX IDLE 1810.

If the response to the channel request is Channel Acknowledged (ACKCH), the TxSM 1625 asserts CSUOK 1623 and resets N_CTR (1836), and transitions to a Wait for My Address B state (1860). In this state 1860, the TxSM 1625 waits for TXADDR (1866). Any of three transitions may occur to a Command state 1870, or the TxSM 1625 may transition to TRANS DONE 1850.

If the FIFO has asserted TXLRDY 1628 (1867b and 1867c), the TxSM 1625 begins a Data Available (DAV) cycle on its next time slot. The DAV cycle comprises storing the DAV message into the command buffer 1630 for transfer onto the command portion of the backplane 1660. Otherwise, the TxSM 1625 sends a NOP command message (1867a) and transitions to the Command 1870. If the FIFO 1638a has not yet been loaded with the last data to transmit to the data destination device (!LDAVTX), then the TXSM 1625 sends a Data Available command message (DAV) 1867b and transitions to Command 1870. If the FIFO 1638a has been loaded with the last data to transmit to the data destination device (LDAVTX), then the TxSM 1625 sends the Last Data Available command message (LDAV) 1867c and transitions to Command 1870. From Command 1870, the TxSM 1625 asserts OEBABC (1878) and transitions to a Check Response to DAV state (CHK RSP DAV) 1880. The destination slot will respond with either an Acknowledge (ACK) or a Negative-Acknowledge (NAK). An ACK indicates that the destination slot is ready to receive data, with an assumption that the first packet has been received by the destination slot because the destination slot is ready. A data destination device will normally be in the addressed slot, and as described below, a latch in the data destination device receives and holds the transferred data. A NAK indicates that the destination slot, although filled, is not available to receive a data transfer. This may be because the destination slot has not yet clocked in previously received When the FIFO 1638 negates AE 1635 and FIFORD 1627 is asserted, the FIFOSM 1626 commands the FIFO 1638 to send the next packet to the latch 1639. Also, if the data source device is a data communication device, collisions in the FIFO 1628 may be avoided by making the FIFOSM 1626 wait for receive cycles to finish (!RXACTIVE). The FIFOSM 1638 includes a Transmit Active line (TXACTIVE) which is used in a complementary way to RXACIVE when a data communication device (a data destination device having data source capabilities) has data to receive. Because, in the disclosed embodiment, the FIFO 1638 is only 32-bits wide, three pop operations are needed to fill the latch.

If FIFORD 1627 is asserted but AE is also asserted 2012, then the FIFOSM 1626 transitions to a Wait AE state 2020. From Wait AE 2020, the FIFO 1638 waits for AE to be deasserted or for TC 1636 to be asserted 2023, then transitions to RD1 2030 to send the next word (if !AE) or the last packet (if TC). However, if TXDONE 1624 is asserted while the FIFOSM 1626 is in Wait AE 2022, then the FIFOSM 1626 transitions back to IDLE READ 2010.

As mentioned, three pop operations are necessary to move a 96-bit packet from the FIFO 1638 into the latch 1639. The first pop is to the A latch ("POP A") 2013. In this transition, the FIFOSM 1638 asserts ENB to enable the pop. If the data source device is a data communication device, the FIFOSM 1638 also asserts TXACTIVE. Next, the FIFOSM 1626 transitions to a Read 1 state (RD1) 2030. In RD1 2030, the FIFOSM 1626 asserts ALATCH, to latch the data from the FIFO 1638 in the A portion of the latch 1639. Similar transitions and actions are made to pop the next two 32-bit words to the latch in states 2040 and 2050. Beginning after the first word is popped (2013), the FIFO 1638 can accommodate a word of new data. The FIFOSM 1626 asserts TXLRDY 1628 whenever data (three 32-bit words) has been transferred to the latches 1639. This is done in states 2040, 2050 and 2070.

In the event that a word being moved into the latch 1639 is the last word of data to

FIFOSM

The FIFOSM 1626 pops data from the FIFO 1638 into the latches 1639. The FIFOSM 1626 is coupled to the FIFO

1638 via a FIFO control line 1634, a FIFO status line 1635 and an End of Packet (TC) line 1636. The FIFO control line 1634 includes latch enable flags (ALATCH, BLATCH, CLATCH) and an Enable Buffer flag (ENB). The FIFO status line 1635 can have values of Almost Empty (AE) and Empty (EF). ENB signals when data is to be popped from the FIFO 1638 to the latch 1639.

As mentioned, TC 1636 is asserted once the packet byte count reaches zero. TC 1636 is used to terminate the packet transfer at the processor side of the interface circuit 1620 when transmitting. This signal is propagated to and from the FIFO 1638 via lines 1641, 1636 and is used to terminate the channel on the backplane side of the interface channel 1620. This signal, once detected by the FIFOSM 1626, asserts LDAVTX 1629 which instructs the TxSM 1625 to issue an LDAV message on the data source device's next time slot.

Figure 20:
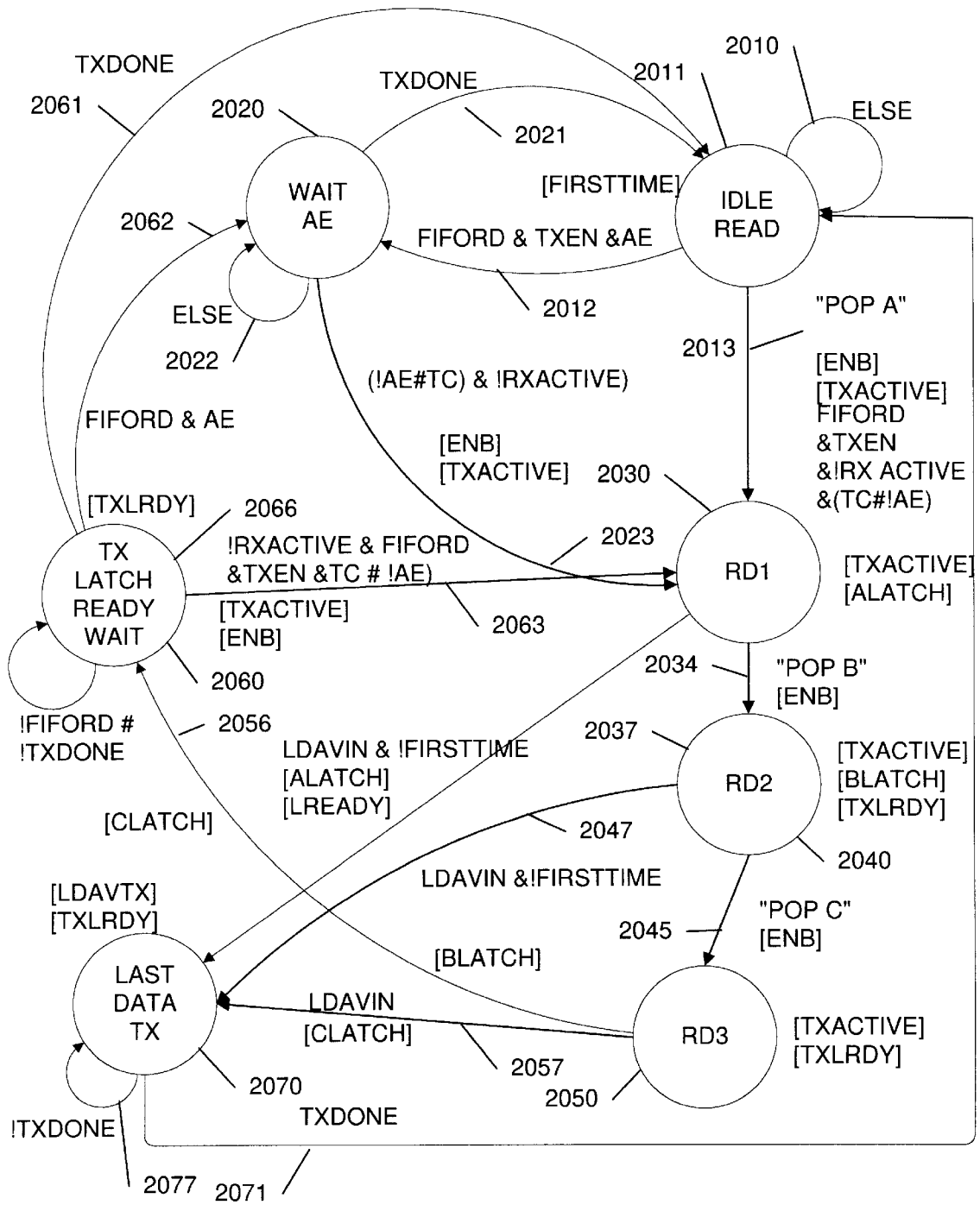
FIG. 20 is a state diagram of a FIFO controller state machine in the data source device of FIG. 16.

Referring now to FIG. 20, there is shown a state diagram of the FIFOSM 1626. The FIFOSM 2010 is initialized to an IDLE READ state 2010. Preferably, the FIFOSM 1626 should prevent data from being transferred from the FIFO 1638 to the latch until the data to be sent has reached the output stage of the FIFO 1639.

When the FIFO 1638 negates AE 1635 and FIFORD 1627 is asserted, the FIFOSM 1626 commands the FIFO 1638 to send the next packet to the latch 1639. Also, if the data source device is a data communication device, collisions in the FIFO 1628 may be avoided by making the FIFOSM 1626 wait for receive cycles to finish (!RXACTIVE). The FIFOSM 1638 includes a Transmit Active line (TXACTIVE) which is used in a complementary way to RXACIVE when a data communication device (a data destination device having data source capabilities) has data to receive. Because, in the disclosed embodiment, the FIFO 1638 is only 32-bits wide, three pop operations are needed to fill the latch.

If FIFORD 1627 is asserted but AE is also asserted 2012, then the FIFOSM 1626 transitions to a Wait AE state 2020. From Wait AE 2020, the FIFO 1638 waits for AE to be deasserted or for TC 1636 to be asserted 2023, then transitions to RD1 2030 to send the next word (if !AE) or the last packet (if TC). However, if TXDONE 1624 is asserted while the FIFOSM 1626 is in Wait AE 2022, then the FIFOSM 1626 transitions back to IDLE READ 2010.

As mentioned, three pop operations are necessary to move a 96-bit packet from the FIFO 1638 into the latch 1639. The first pop is to the A latch ("POP A") 2013. In this transition, the FIFOSM 1638 asserts ENB to enable the pop. If the data source device is a data communication device, the FIFOSM 1638 also asserts TXACTIVE. Next, the FIFOSM 1626 transitions to a Read 1 state (RD1) 2030. In RD1 2030, the FIFOSM 1626 asserts ALATCH, to latch the data from the FIFO 1638 in the A portion of the latch 1639. Similar transitions and actions are made to pop the next two 32-bit words to the latch in states 2040 and 2050. Beginning after the first word is popped (2013), the FIFO 1638 can accommodate a word of new data. The FIFOSM 1626 asserts TXLRDY 1628 whenever data (three 32-bit words) has been transferred to the latches 1639. This is done in states 2040, 2050 and 2070.

In the event that a word being moved into the latch 1639 is the last word of data to be sent, the flow from RD1 2030 to RD2 2040 to RD3 2050 must be bypassed. This is accomplished when LDAVIN is asserted. To empty the FIFO 1638 in such circumstance, the appropriate latch enable flag is set (ALATCH, BLATCH or CLATCH), and the FIFOSM 1626 transitions to a Last Data Transmit state (LAST DATA TX) 2070. In LAST DATA TX 2070, the FIFOSM 1626 asserts TXLRDY 1628 and LDAVTX and waits for TXDONE 2077, then transitions back to IDLE READ 2010.

If LDAVIN is not asserted after POP C, then from RD3 2050 the FIFOSM 1626 transitions to a Transmit Latch Ready Wait state (TX LATCH READY WAIT) 2060. In this state 2060, the FIFOSM 1626 asserts TXLRDY and waits for assertion of FIFORD 1627 or TXDONE (2066). If TXDONE 1624 is asserted 2061, then the FIFOSM 1626 transitions to IDLE READ 2010. Otherwise, there is more data to send. If FIFORD is asserted and the FIFO 1638 is not AE (2063), then the FIFOSM 1638 transitions back to RD1 2030 to move another three words from the FIFO 1638 to the latch 1639. If FIFORD 1627 is asserted but the FIFO is AE, then the FIFOSM 1626 transitions to the Wait AE state 2020.

Preferably, the Tx software driver performed by the CPU 1611 is tightly coupled to the Tx hardware. Once the driver decides to send a packet over the bus and issues the TXGO bit, it will have to wait until TXDONE is asserted. In other words, no other packet transmission by the data source device can occur until the transmission in progress is finished. TXDONE is used as an interrupt to the processor to indicate the end of a transmission. Preferably, the software driver examines the Tx Status register (0x30000400) to determine the status of the last Tx. In case of a CHNAK message, for example, the software driver has the option of retrying the same packet transfer.

Preferably, the data source device is prepared to terminate packet transmission in the event of any of the following four error cases, as represented by the corresponding response messages:

EMPTY: indicates that the software driver is trying to send a packet to a slot that does not have a data destination device present.

CHNNAK: indicates that the receiver is busy receiving from another data source device or sending data to a data destination device.

DAVNAK: indicates that a maximum number of NAKs (preferably 32) were received since the last data ACK. As explained below, data destination devices assert a Receive Wait line (RXWAIT) to prevent packet reception before clearance of its last packet by its software driver (writing to location ERROR_RST, 0x30000200). Note that no activity can start unless the FIFO in the data source device and ERROR_RST are reset.

DISC: This is a response from the receiver when the transmitter is too slow in commanding DAVs. After a NOPOV error condition in the receive, the DISC response is given to the transmitter.

In the above error cases, TXDONE 1624 is asserted and all the state machines 1621, 1625, 1626, 1644 transition to IDLE state. The error condition is captured in the Transmit Status Register (TXSTATUS, 0x30000400). It is the responsibility of the software driver to read this register before starting a new packet transmission.

The Processor Side of the Interface Circuit—
DMASM

The processor side of the interface circuit 1610 controls the FIFO's A-side 1638*a*. The DMASM 1644 controls data traffic between the memory 1612 and the FIFO's A-side 1638*a*.

The DMASM 1644 is coupled to the processor circuit 1610 (and preferably the DMA controller in the CPU 1611)

via a DMA Request line (DREQ or DMA REQ) 1616, a DMA Acknowledge line (DMA ACK) 1619, a terminal count line (TC) 1618 and a Ready Blast line (READY BLAST) 1617. These lines are used by the DMSM 1644 to control the processor circuit 1610 and to receive status information from the processor circuit 1610. DMA REQ 1616 is used to signal to the processor circuit 1610 that a DMA transfer is needed by the interface circuit 1620. The processor circuit 1610 indicates that the DMA transfer may proceed by asserting DMA ACK 1619.

The processor circuit monitors the number of packets remaining to be transferred from the memory 1612 to the FIFO 1638, and asserts TC 1618 when the last packet is being sent. TC 1641 is the same indication of the end of packet in transmit. However, TC 1641 is used to tag the last word that is pushed into the FIFO 1638. The tagged word is used later at the backplane side of the interface circuit 1620 to terminate the packet transfer.

The DMASM 1644 is coupled to the FIFO 1638 via an End of Packet line (TC) 1641, a FIFO control line 1643 and a FIFO status line 1646. TC 1641 has the same function as the other TC lines, described above. The FIFO control line 1643 includes latch enable flags (ALATCH, BLATCH, CLATCH) and an Enable Burst flag (ENB). The FIFO status line 1646 can have values of Almost Empty (AF) and Full (FF). An Enable FIFO flag (ENFIFO) signals that the FIFO 1638 can accept data. A BLAST flag signals that data should be transferee into the FIFO 1638.

Figure 17:
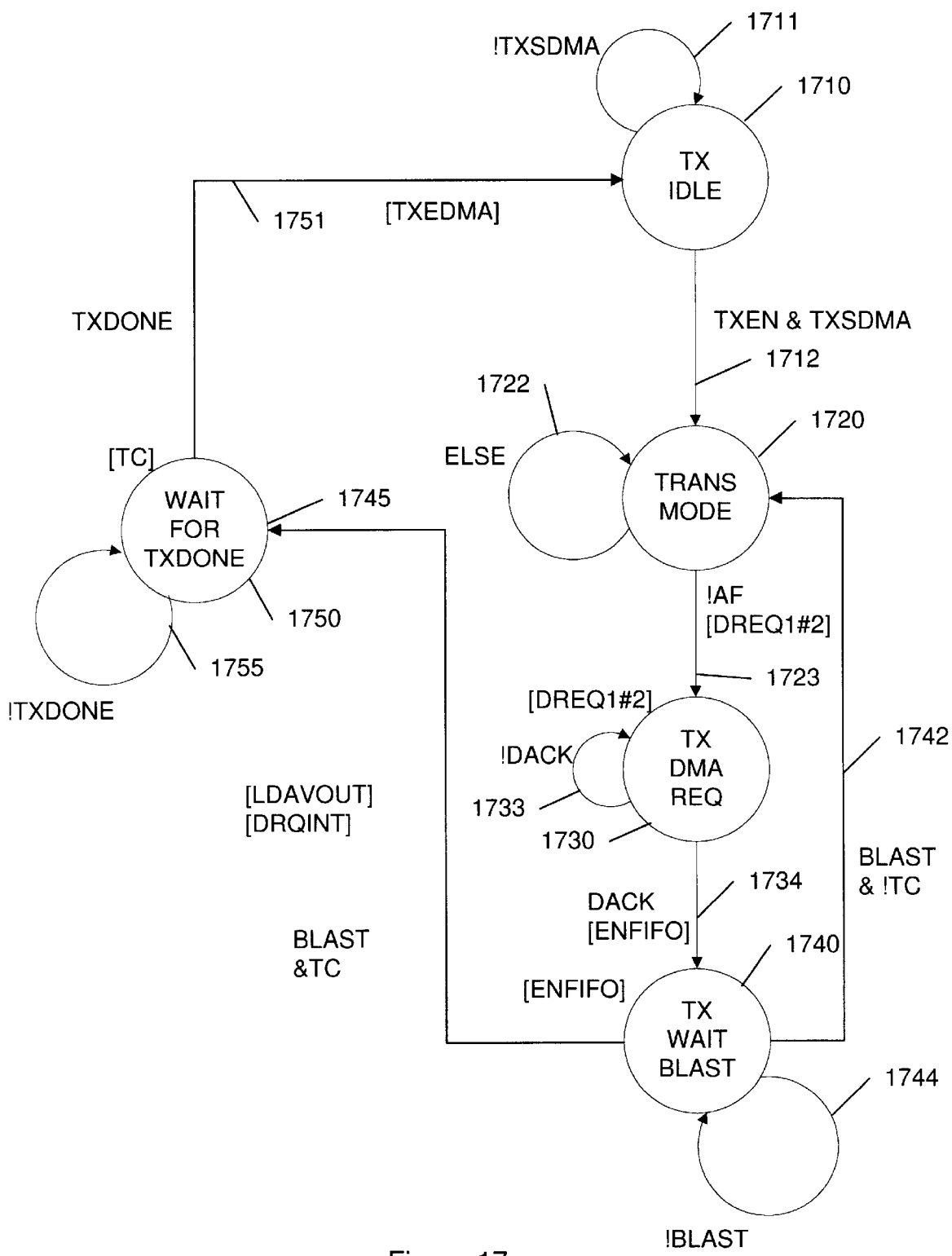
FIG. 17 is a state diagram of a DMA controller state machine in the data source device of FIG. 16.

After the backplane side has set up a channel to transmit data to a desired data destination device, the TxMSM 1621 asserts TxSDMA 1613 to start the DMASM 1644 transferring data from the memory 1612 to the FIFO 1638. Referring now to FIG. 17, there is shown a state diagram for the DMASM 1644.

The DMASM 1644 initially is in a Transmit Idle state (TX IDLE) 1710. So long as TXSDMA 1613 is not asserted (1711), the DMASM 1644 remains in the idle state 1710.

If TxSDMA is asserted (1712), then the DMASM 1644 begins a DMA cycle by transitioning to a Transmit Mode state 1720. If the FIFO 1638 is almost full 1722, then the DMASM 1644 remains in Transmit Mode 1720. If the FIFO 1638 is not full (!AF), then the DMASM 1644 asserts DREQ 1616 to indicate that DMA access is needed, and transitions to a Transmit DMA Receive state 1730. Until DACK is asserted, the DMASM 1644 waits 1733. If the processor circuit 1610 is ready to transfer data, the processor circuit 1610 asserts DACK 1619, and the DMASM 1644 asserts ENFIFO (1734) and transitions to a Transmit Wait for Blast state 1740. The DMASM 1644 keeps ENFIFO asserted while in this state 1740.

The DMASM 1644 waits for a BLAST signal 1617 from the FIFO 1638 (1744), then either cycles back to TRANS MODE 1720 (if TC is not asserted), or transitions to a Wait for Transmit Done state 1750 (if TC is asserted). In both cases the memory 1612 transfers 128-bits of data (a burst cycle for the i960) into the FIFO's A-side 1638a. BLAST 1617, coming from the CPU, indicates the end of a DMA cycle. Assertion of DREQ 1616 then DACK 1619 then BLAST comprises a complete DMA cycle. The DMA transfers continue as long as the packet byte count (maintained by the CPU 1611) is a non zero value. Since TC 1641 is always asserted before the end of a packet transfer, the DMASM 1644 waits until TXDONE 1624 is asserted to go back to TX IDLE 1710.

When a packet transfer is incomplete, the TXSM 1625 asserts TXDONE 1624 before the CPU 1611 asserts TC 1618. Preferably, the TxSM 1625 also notifies the CPU 1611 on TXSTATUS 1614.

Rx Data Flow

Figure 22:
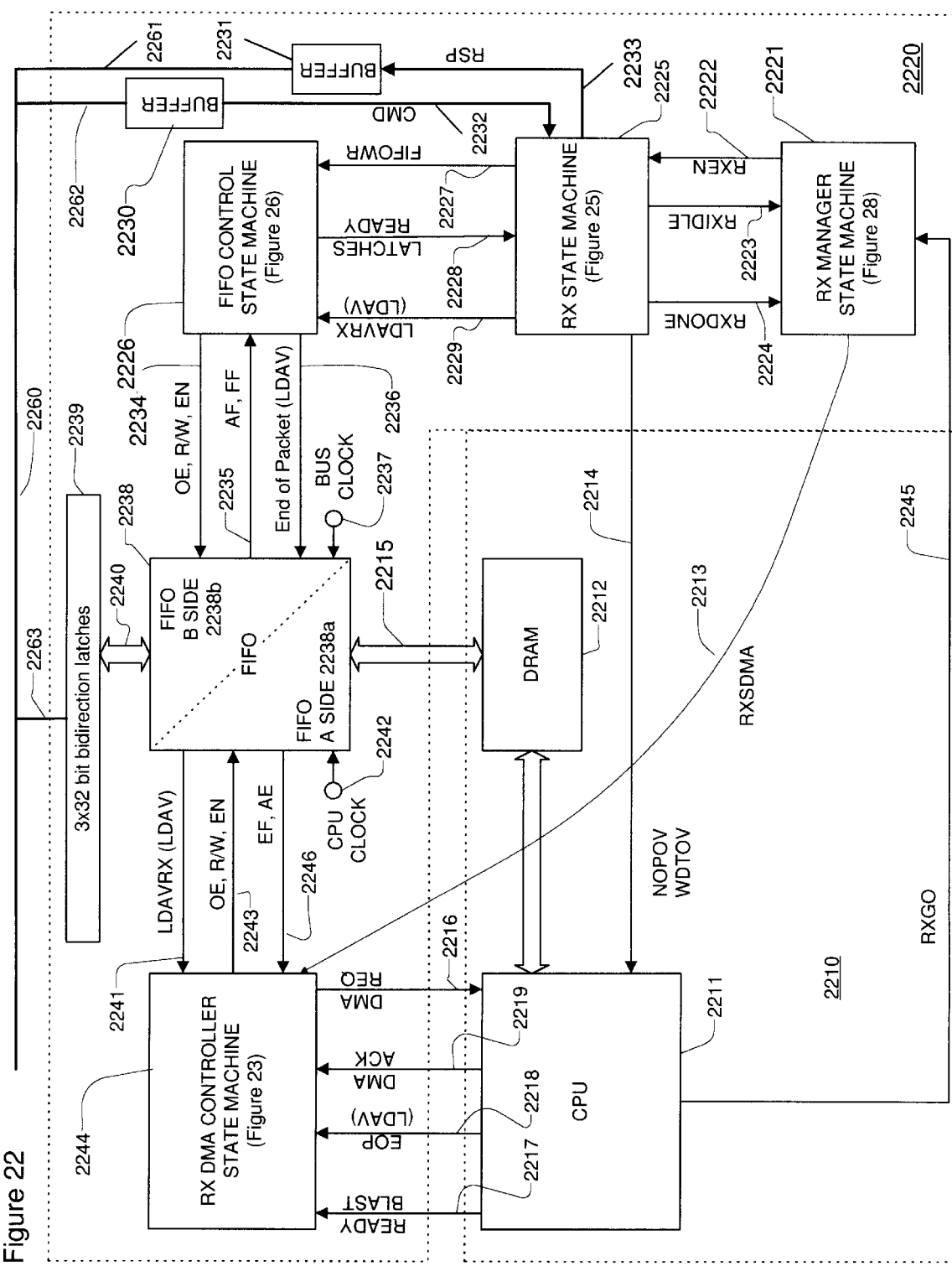
FIG. 22 is a data flow diagram of data receipt by a data destination device from a bus in accordance with the present invention.

Referring now to FIG. 22, there is shown a data flow diagram for data reception by a data destination device from a backplane 2230. The data flow within the data destination device is quite similar to but corresponding to the data flow within the preferred data source device described above. Accordingly, reference numbers in the figures relating to the data destination device correspond closely to those figures relating to the data source device. Thus, the backplane 1630 in FIG. 16 is shown as the backplane 2230 in FIG. 22.

The data destination device includes an interface circuit 2220 and a processor circuit 2210. The interface circuit 2220 and the processing circuit 2210 are connected by and communicate through several lines 1613–1619. The interface circuit 2220 and the processing circuit 2210 are connected by and communicate through several lines 2213–2219. Similar to FIG. 16, in FIG. 22, the bus (the P-Bus 10 of FIG. 2) is considered to comprise the backplane 2260, the interface 2220 and several connecting lines 2261–2263.

The processor circuit 2210 comprises a CPU 2211 and a memory 2212. The CPU 2211 and memory 2212 are preferably coupled via a bus for high speed transfers. The CPU 2211 is preferably an Intel Corporation (San Jose, Calif.) i960 microprocessor having an on-chip DMA controller (not shown). Data transfers to the interface circuit 2220 come from the CPU 2211. Preferably, these data transfers are made in a number of packets. Data transfers to the CPU 2211 come from the interface circuit 2220. In the disclosed embodiment, where the data destination device comprises a processor board, the processor circuit includes system DRAM (see DRAM 82 of FIG. 4), and the memory 2212 comprises the system DRAM. The processor circuit 2210 further comprises a CPU clock 2242, which provides timing signals to the various components of the processor circuit 2220.

The backplane 2260 of the P-Bus 10 includes a data bus portion (DAT) 2263, a command bus portion (CMD) 2262 and a response bus portion (RSP) 2261. The data bus portion 2263 is coupled to the interface circuit 2220 for moving data from the backplane 2260 to the interface circuit 2220. The command bus portion 2262 is coupled to the interface circuit 2220 for moving command messages from the backplane 2260 to the interface circuit 2220. The response bus portion 2261 is coupled to the interface circuit 2220 for moving response messages from the interface circuit 2220 to the backplane 2260.

The interface circuit 2220 comprises 8 elements: a DMA receive controller state machine (DMASM) 2244, a FIFO 2238, a FIFO control state machine (FIFOSM) 2226, a Receive state machine (RXSM) 2225, a Receive Manager state machine (RXMSM) 2221, a command bus buffer 2230, a response bus buffer 2231, and a latch 2239. Each of these state machines is implemented by the P-Bus controller 66 (FIG. 4). The interface circuit 2220 includes the interconnections of these elements, 2240, 2234–2236, 2227–2229, 2222–2224, 2232–2233, 2241, 2243, 2246, and a clock line 2237 which is received from the backplane 2260. The state machines 2244, 2226, 2225 and 2221 preferably are embodied as one or more programmable logic devices (e.g., PLAs or PLDs), and this may be accomplished using the PLA programs set forth in Appendix A.

The FIFO 2238 (FIFO 64 in FIG. 4) has an A-side 2238a and a B-side 2238b. In data destination devices, the FIFO need only be able to move data from the B-side 2238b to the A-side 2238a. Preferably, the size of the FIFO's A-side 2238a is large enough to accommodate high speed data transfers to the processor circuit 2210. Thus, in disclosed embodiment, the FIFO 2238 is 32-bits wide to accommodate the 128-bit (4×32 bits) burst transfer mode of the i960.

The latch 2239 preferably is adapted to the width of the data bus and the FIFO 2238. In the disclosed embodiment, wherein the data bus is 96 bits wide, the latch comprises three 32-bit latches, referred to herein as A, B and C. The FIFO's B-side 2238b includes a switching circuit to switch the input of the FIFO 2238 to each of the three latches 2239.

The interface circuit 2220 can be divided into two logical sections: a processor side and a backplane side. The processor side comprises the DMASM 2244, the FIFO's A-side 2238a and the interconnecting lines 2241, 2243, 2246. The backplane side comprises the FIFO's B-side 2238b, the FIFOSM 2226, the TxSM 2225, the TxMSM 2221, the latches 2239, the buffers 2230, 2231, and their interconnections 2240, 2234–2236, 2227–2229, 2222–2224, 2232–2233, and operates according to a clock 2242 generated by the processor circuit 2210. The processor side sets up memory transfers from the interface circuit 2220 to the processor circuit 2210. The backplane side is more complex, fulfills the bus protocol as used on the backplane 2260, and manages data transfers to the interface circuit 2220 from the backplane 2260. Accordingly, after the backplane side sets up a data channel, the processor side and backplane side alternate between the backplane side filling the FIFO 2238 and the processor side emptying the FIFO 2238. Because the backplane 2260 and the processor circuit 2210 have independent clocks 2237, 2242, the interface circuit 2220 also synchronizes handshaking signals between the processor side and the backplane side.

The Backplane Side of the Interface Circuit

The processor circuit 2210 indicates when data can be received by asserting a 2520. This action starts a packet reception cycle and RXIDLE 2223 is de-asserted. The RxMSM 2225 then asserts RXSDMA to start the DMA cycles from the FIFO 2238 to the local memory 2212.

If the command message is other than CHREQ, or RXA-DDR or RXEN are not asserted, then the RxSM 2225 sends a NAK response message 2511a, 2511b.

From WAIT FOR CMD 2520, the RxSM 2225 monitors the CMD bus 2262 for a DAV command destined for its slot (i.e. RXADDR is asserted), holding RXIDLE negated, and transitions under any of three conditions.

However, the RxSM 2225 remains in WAIT FOR CMD 2520 under any of three other conditions. First, the data source device has sent data (CMD=DAV), and the latch 1639 is ready (RXLRDY 2228 is asserted), and RXADDR is asserted, then the RxSM 2225 sends an ACK response message, clears N__CTR, asserts FIFOWR 2227, and signals WDTCLR on RXSTATUS 2214 to clear the watch dog timer (2522c). FIFOWR 2227 indicates to the FIFOSM 2226 that data is available in the latches 2239 which is to be pushed into the FIFO 2238. For every such DAV command an ACK response is generated unless the FIFO 2238 is Almost Full 2235 (as indicated by RXLRDY being negated), where a NAK response is generated. Second, if while RXADDR is asserted, the latch 2239 is not ready to receive (RXLRDY 2228 is negated), the RxSM 2225 sends a NAK response message and signals WDTCLR on RXSTATUS 2214 to reset the watch dog timer (2522a), and remains in WAIT FOR CMD 2520. Third, if the command message is NOP and RXADDR is asserted, then the RxSM 2225 sends a NAK response message, signals WDTCLR and increments the error counter (N__CTR) (2522b).

As mentioned, three conditions can cause the RxSM 2225 to transition from WAIT FOR CMD 2520 to a Receive Wait state (RX WAIT) 2540. The second and third conditions are error conditions, so the RxSM 2225 terminates packet reception. In all three conditions, the RXSM 22225 asserts RXDONE 2224, LDAVRX 2229, RXIDLE 2223 and FIFOWR 2227. This will guarantee that the end of packet reception will be detected on the processor side of the interface circuit 2220. There is no need to initialize the interface circuit 2220 after detection of the above receive error conditions.

First, if the command message is LDAV and RXADDR is asserted, packet reception terminates. The RXSM 2225 sends an ACK response message. This command message causes RXLDAV 2229 to be asserted. RXLDAV 2229 is used to tag the end of packet. The last word that is being pushed into the FIFO 2238 will have the end of packet bit set (B__LDAVIN.) This logic line is monitored by the DMASM 2244 on the processor side of the interface circuit 2220.

Second, if the command message is NOP, RXADDR is asserted and the error counter N__CTR has reached its maximum (MAX), then the RxSM 2225 signals NOPOV on RXSTATUS 2214 and sends a NAK response message. An error condition is assumed if there are too many NOPs between DAVs (preferably set to 32 consecutive NOPs). NOPOV is asserted when maximum NOPs are received after a DAV.

Third, the watch dog timer may overrun so that WDTOV is signalled on RXSTATUS 2214. An error condition also results if the transmitter stops sending command messages (DAV or NOP). This could happen if the data source device is forced to reset, screeched or was removed during a transfer cycle. The RxSM 2225 includes a watch dog timer, which preferably asserts a Watch Dog Timer Overflow line (WDTOV) 2214 approximately 125 $\mu$sec after the last DAV command.

After transition to RX WAIT 2540, the RXSM 2225 asserts RXIDLE and then transitions back to RX IDLE 2510. LDAV 2229 is used to terminate the packet transfer at the processor side of the interface circuit 2220 when transmitting. This signal is propagated to and from the FIFO 2238 via lines 2241, 2236 and is used to terminate the channel on the backplane side of the interface channel 2220.

While in WAIT FOR CMD 2520, if MNP is negated and the command message is BRST (board reset) and RXADDR is asserted, then the RxSM 2225 sends an ACK response message (2523), and transitions to a Hold Reset state (2530). The RxSM 2225 remains in Hold Reset 2530 until RXTERM is asserted (2531), when the RxSM 2225 transitions to RX IDLE 2510.

RXMSM

The RxMSM 2221 is coupled to the DMASM 2244 via a Receive Start DMA line (RXSDMA) 2213. RxSDMA 2213 signals that the DMASM should move data from the FIFO 2238 into the processor circuit 2210.

Figure 28:
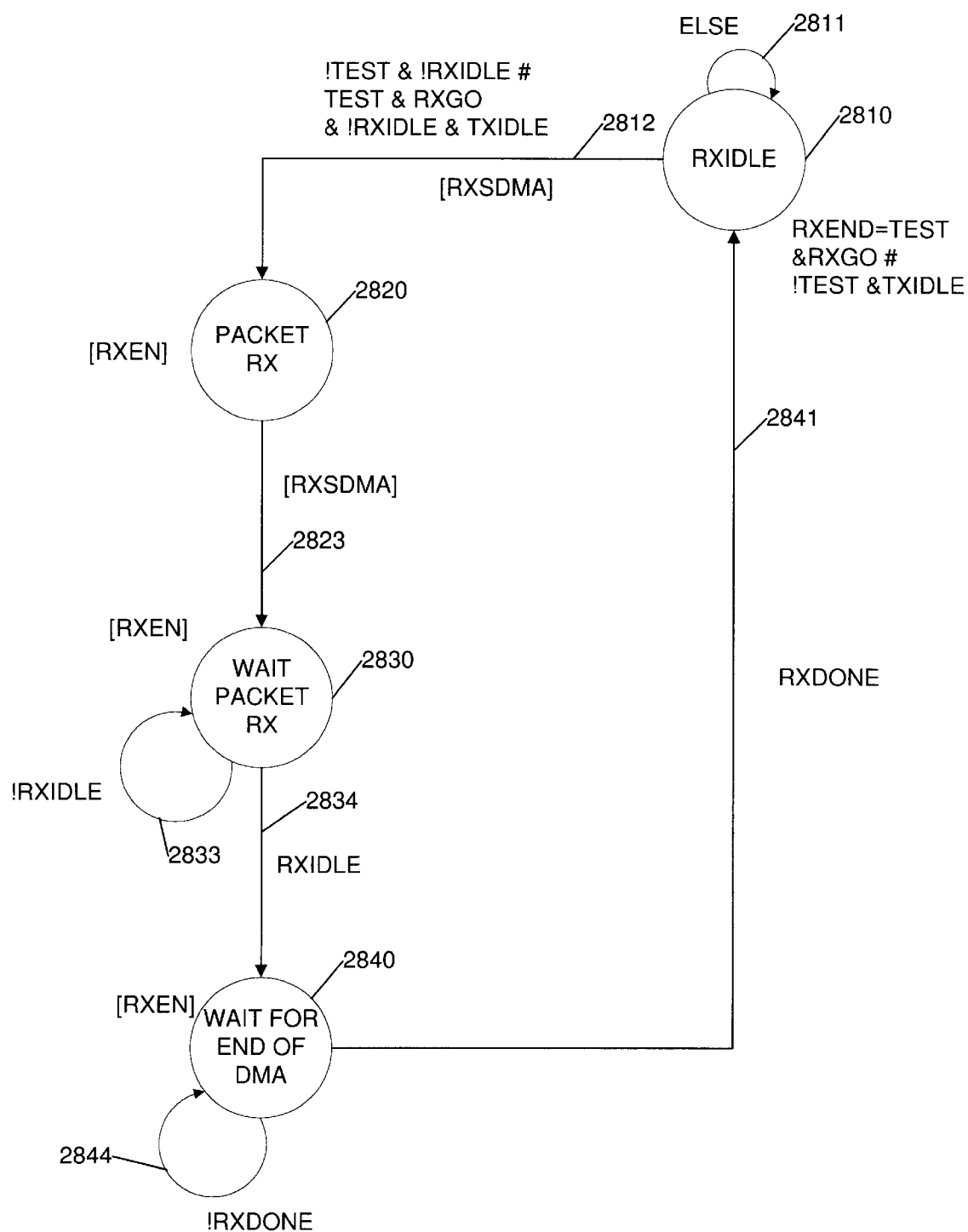
FIG. 28 is a state diagram of a bus manager state machine in the data destination device of FIG. 22.

Referring now to FIG. 28, there is shown a state diagram of the RxMSM 2221. FIG. 28 also includes information respecting the incorporation of testing features in the RxMSM 2221. For clarity, this discussion does not address the testing in depth.

The RXMSM 2221 initializes into an Idle state (RXIDLE) 2810. When the RxSM 2225 negates RXIDLE 2223

(indicating that data is to be received), the RxMSM 2221 asserts RXSDMA 2213 (2812) to initiate data transfers from the P-Bus latches 2234 to the FIFO 2238, and transitions to a Packet Receive state 2820. In the Packet Receive state 2820, the RxMSM 2221 asserts RXEN and continues to assert RxSDMA (2823) and transitions to a Wait for Packet state 2830. In Wait for Packet 2830, the RxMSM 2221 waits for the RxSM 2225 to assert RXIDLE 2223 (2833), indicating imminent completion of the data transfer. When RXIDLE 2223 is asserted (2834), the RXMSM 2221 transitions to a Wait for End of DMA state 2840. In this state 2840, the RxMSM asserts RXEN 2222 and waits for the RxSM 2225 to assert RXDONE 2224 (2844) indicating completion of its data transfer. When this is done (2841), the RxMSM 2221 transitions back to RX IDLE 2810.

FIFOSM

The FIFOSM 2226 monitors the FIFO 2238 for AF (FIFO Almost Full) or FF (FIFO Full) conditions. In either case (AF or FF), the FIFOSM 2226 de-asserts RXLRDY 2228 which causes the RxSM 2225 to send the NAK response to DAV commands. As soon as the FIFO 2238 is not AF, RXLRDY 2228 will be asserted which allows more data reception.

The FIFOSM 2226 pushes data from the latch 1639 into the FIFO 2238. The FIFOSM 2226 is coupled to the FIFO 2238 via a FIFO control line 2234, a FIFO status line 2235 and an End of Packet line (LDAV) 2236. The FIFO control line 2234 includes latch enable flags (ALATCH, BLATCH, CLATCH) and an Enable Burst flag (ENB). The FIFO status line 2235 can have values of Almost Full (AF) and Full (FF). ENB signals when data is to be popped from the FIFO 1638 to the latch 2239.

Figure 26:
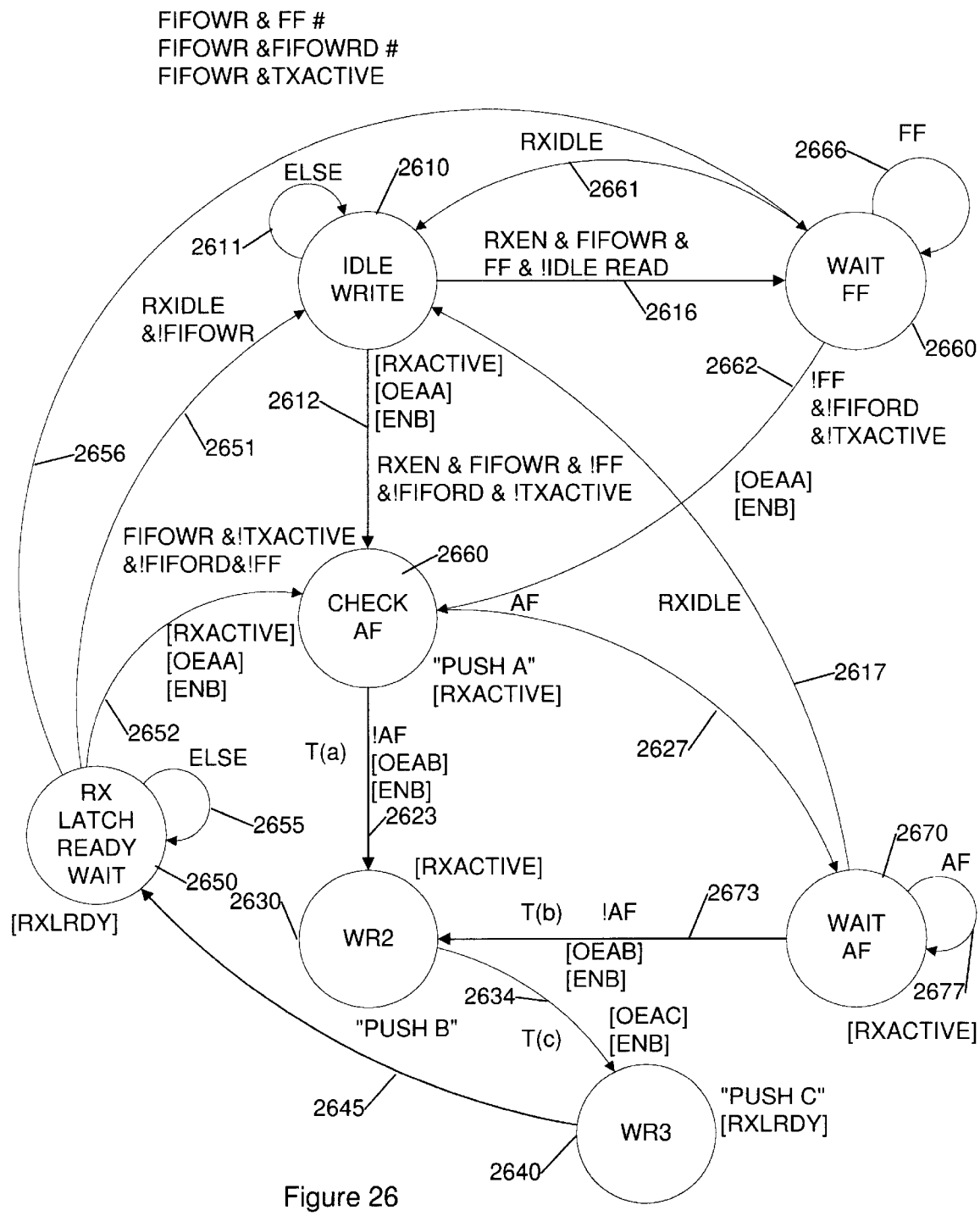
FIG. 26 is a state diagram of a FIFO controller state machine in the data destination device of FIG. 22.

Referring now to FIG. 26, there is shown a state diagram of the FIFOSM 2226. The DMASM 2244 simultaneously functions as the state machine in FIG. 27. The FIFOSM 2226 initially is in an Idle state 2610. If the receiving is enabled (RXEN is asserted) and there is data to write (FIFOWR is asserted by the FIFO 2238 on line 2246) and the FIFO 2238 is not full (FF is not asserted) (2612), then the FIFOSM 2226 will transition to a Check AF state 2620. Also, if the data destination device is capable of transmitting, then this transition 2612 may only occur if FIFORD and TXACTIVE are not asserted. In this transition 2612, the FIFOSM 2226 asserts RXACTIVE, OEAA and ENB to transfer the data from the A portion of the latch 2239 to the FIFO 2238. However, if the FIFO 2238 is full, then the FIFOSM 2226 must wait for the FIFO 2238 to empty (2616). This entails a transition to a Wait While FIFO Full state (WAIT FF) 2660. If RXIDLE 2223 is asserted while waiting (2661), then the FIFOSM 2226 transitions back to Idle 2610. Otherwise, when the FIFO 2238 is no longer full, the FIFOSM 2226 asserts OEAA and ENB to transfer the data from the A latch (2662) and the FIFOSM 22264 transitions to Check AF 2620.

Figure 27:
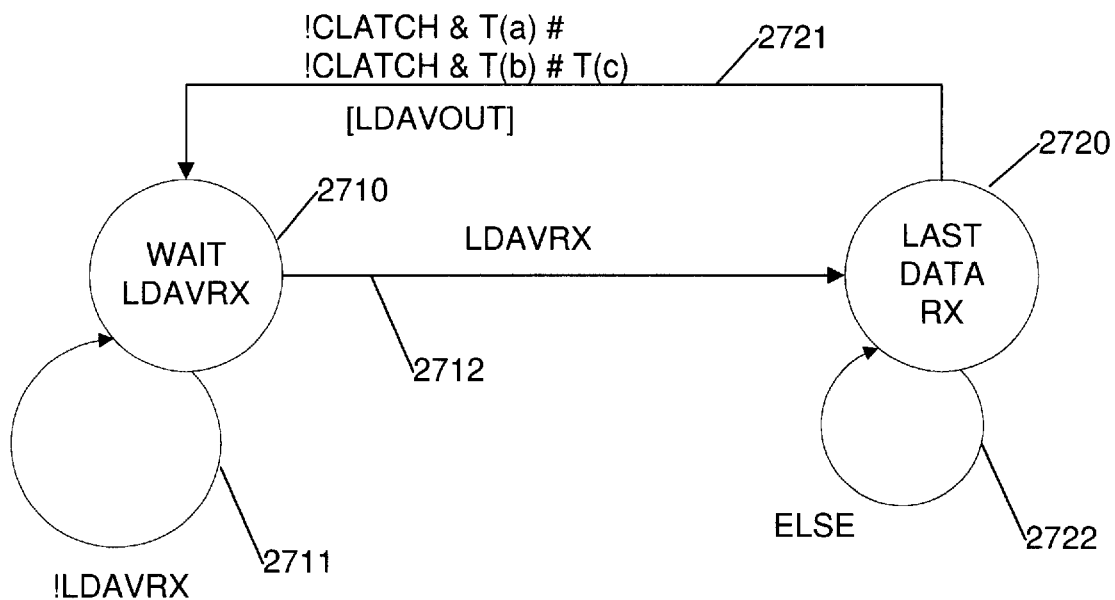
FIG. 27 is a state diagram of a detail of part of the decision making in the state diagram of FIG. 26.

Referring now to FIG. 27, there are two states—Wait for LDAV 2710 and Last Data Received 2720. The FIFOSM 2226 remains in Wait for LDAV 2710 (2711) until LDAV 2241 is asserted. The FIFOSM 2226 remains in Last Data Received 2720 (2722) until CLATCH & T(a) are asserted or CLATCH and T(b) are asserted or T(c) is asserted.

Referring again to FIG. 26, beginning with Check AF 2620, the FIFOSM 2226 transfers the data from the FIFO 2238 to the memory 2212. In Check AF 2620, the FIFOSM 2226 signals the FIFO 2238 to push the A portion of the latch 2239 and asserts RXACTIVE. If the FIFO is almost full because of the Push A, the FIFOSM 2226 transitions to a Wait Almost Full (WAIT AF) state 2670. Then, the FIFOSM 2226 waits (2677) until AF is negated, and transitions to a WR2 state 2630 to continue pushing data into the FIFO 2238. However, if RXIDLE is asserted while the FIFOSM 2226 is in WAIT AF 2677 (2617), then the FIFOSM 2226 transitions back to Idle 2610.

From Check AF 2620, if the FIFO 2238 is not almost full, then the FIFOSM 2226 asserts OEAB and ENB (2627) and transitions to WR2 2630. In WR2, the FIFOSM 2226 pushes the contents of the B latch into the FIFO 2238, asserts RXACTIVE, and then asserts OEAC and ENB (2634). After transitioning to a WR3 state 2640, the FIFOSM 2226 asserts RXLRDY and pushes the contents of the C portion of the latch 2239 into the FIFO 2238.

After the C latch is pushed, the FIFOSM 2226 transitions from WR3 2640 to a Receive Latch Ready Wait state 2650. In this state 2650, the FIFOSM 2226 asserts RXLRDY 2228. The FIFOSM 2226 will transition from RX LATCH READY WAIT 2650 in any of three conditions. First, if FIFOWR is asserted and the FIFO 2238 is not full, then the FIFOSM 2226 asserts RXACTIVE, OEAA and ENB (2652) and transitions back to Check AF 2620 to push and transfer another packet of data. Second, if RXIDLE 2223 is asserted and FIFOWR 2243 is negated (2651), then the FIFOSM 2226 transitions to Idle 2610. Third, if FIFOWR is asserted and the FIFO is full, or FIFOWR and FIFOWRD are asserted (2656), then the FIFOSM 2226 transitions to WAIT FF 2660.

The Processor Side of the Interface Circuit—DMASM

The processor side of the interface circuit 2210 controls the FIFO's A-side 2238a. The DMASM 2244 controls data traffic between the memory 2212 and the FIFO's A-side 2238a.

The DMASM 2244 is coupled to the processor circuit 2210 (and preferably the DMA controller in the CPU 2211) via a DMA Request line (DREQ or DMA REQ) 2222, a DMA Acknowledge line (DMA ACK) 2219, an End of Packet line (EOP or LDAV) 2218 and a Blast line (BLAST) 2217. These lines are used by the DMASM 2244 to control the processor circuit 2210 and to receive status information from the processor circuit 2210. DREQ 2222 is used to signal to the processor circuit 2210 that a DMA transfer is needed by the interface circuit 2220. The processor circuit 2210 indicates that the DMA transfer may proceed by asserted DMA ACK 2219.

The DMASM 2244 is coupled to the FIFO 2238 via a Last Data Available line (LDAV) 2241, a FIFO control line 2243 and a FIFO status line 2246. LDAV 2241 has the same function as the other LDAV lines, described above. The FIFO control line 2243 includes latch enable flags (ALATCH, BLATCH, CLATCH) and an Enable Burst flag (ENB). The FIFO status line 2246 can have values of Almost Empty (AF) and Full (FF). An Enable FIFO flag (ENFIFO) signals that the FIFO 2238 can accept data. A BLAST flag signals that data has been transfered into the FIFO 2238.

Figure 23:
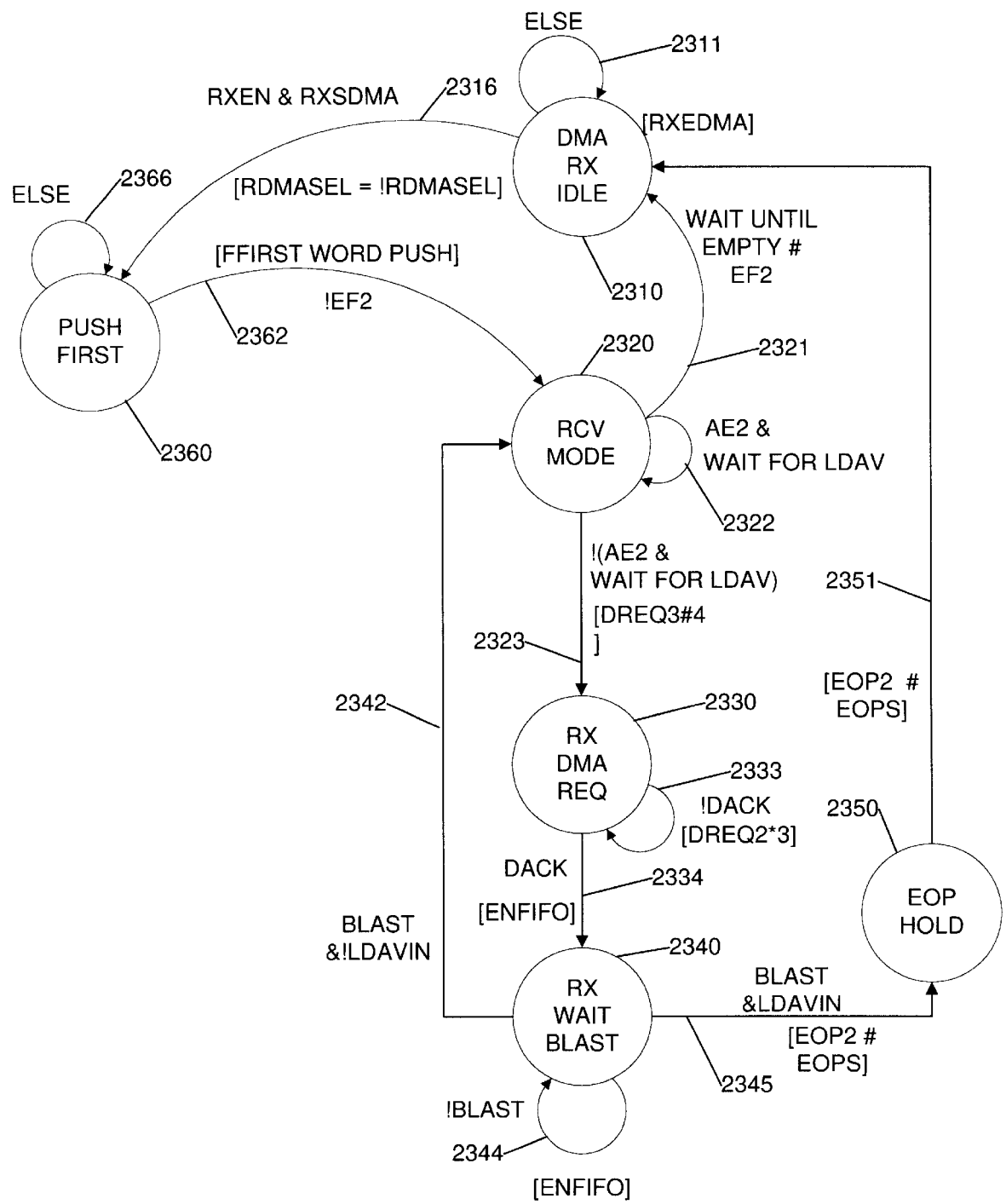
FIG. 23 is a state diagram of a DMA controller state machine in the data destination device of FIG. 22.

After the backplane side has set up a channel to receive data from a data source device, the RXMSM 2221 asserts RXSDMA 2213 to start the DMASM 2244 transferring data from the FIFO 2238 to the memory 2212. The RxMSM 2221 asserts RxSDMA 2245 as soon as the RXSM 2221 identifies a packet reception. RxSDMA 2245 invokes the DMASM 2244 where data transfer starts from the FIFO 2238 to the memory 2212. Referring now to FIG. 23, there is shown a state diagram for the DMASM 2244.

The DMASM 2244 initializes into an Idle state (2310). The DMASM 2244 remains Idle 2310 (2311) until data has been received and transfered into the FIFO 2238 (RXMSM 2221 asserts RxSDMA 2213), then transitions to a Push First state (2360). In Push First 2360, the DMA commands the latch 2239 to push its word of data into the FIFO's B side 2238b. Since the FIFO 2238 may already have data from a prior receive cycle, the DMASM 2244 waits for the FIFO 2238 to have room for the data (negation of EF on the FIFO status 2235 line ) (2366), then transitions to a Receive Mode state 2320.

Figure 24:
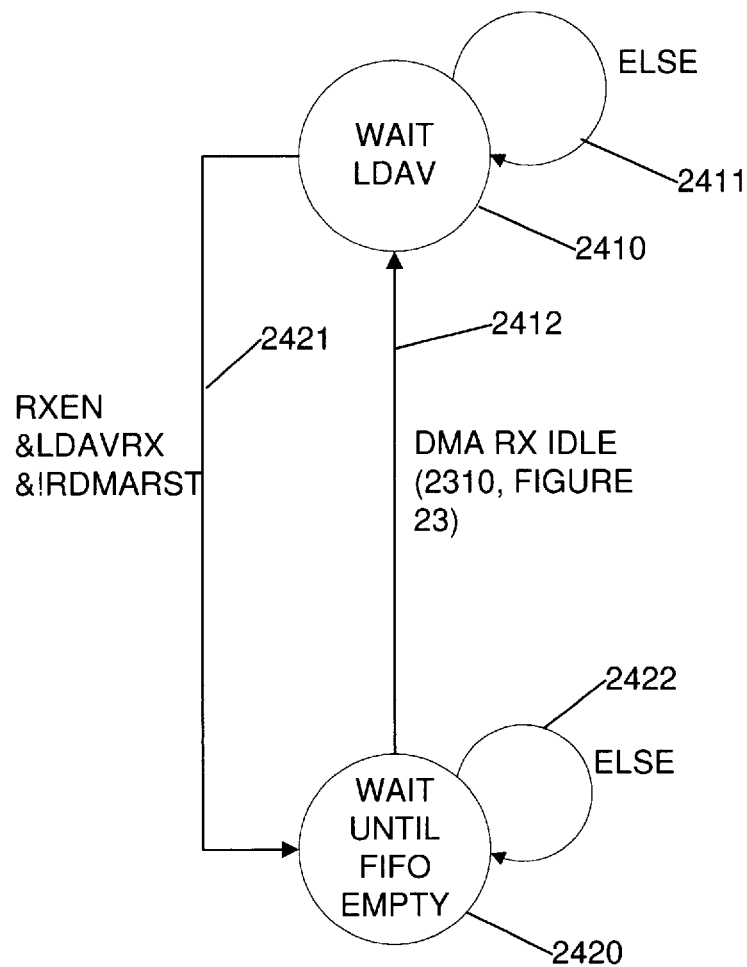
FIG. 24 is a state diagram of a detail of part of the decision making in the state diagram of FIG. 23.
Figure 25:
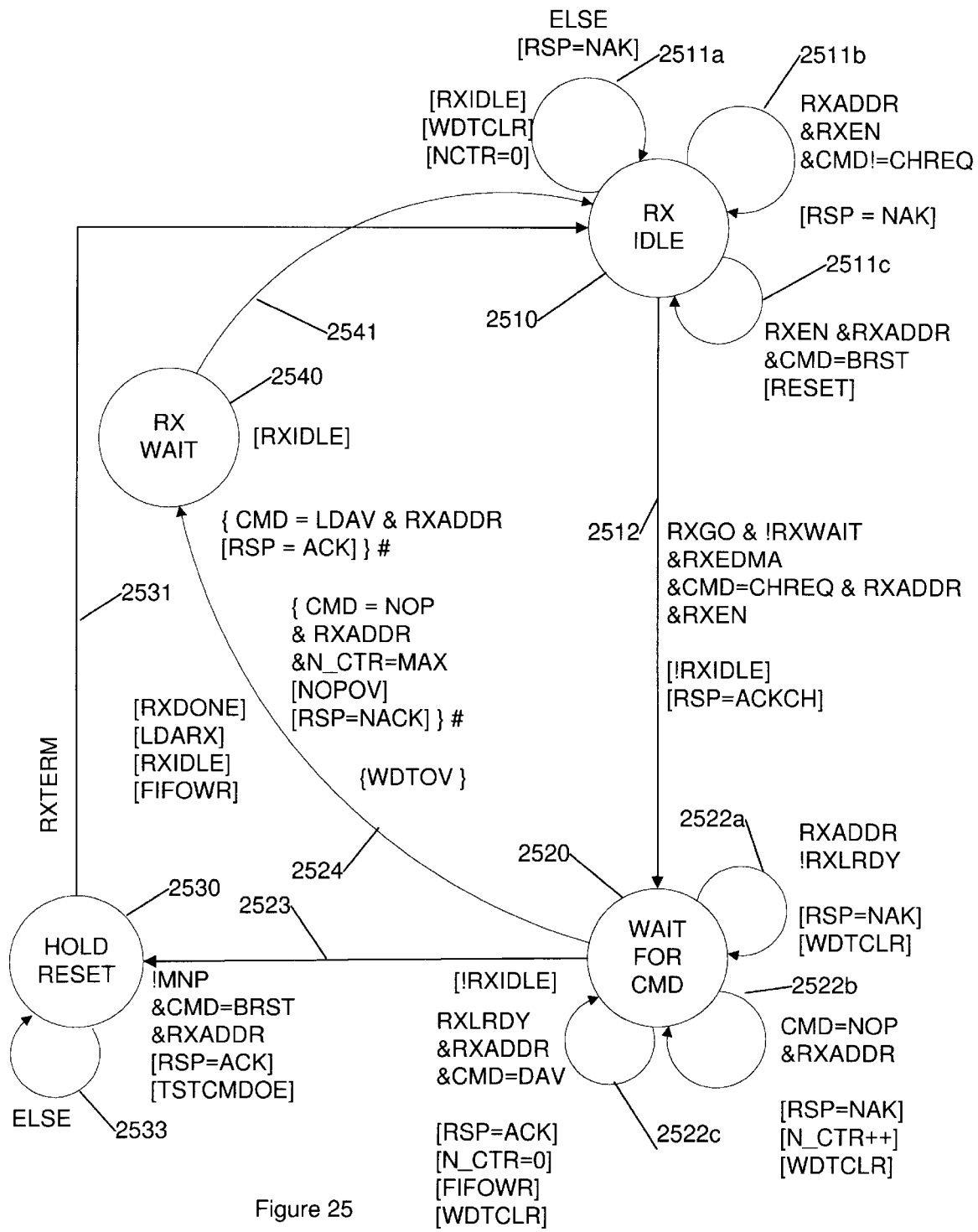
FIG. 25 is a state diagram of a receive state machine in the data destination device of FIG. 22.

From the Receive Mode 2320, the DMASM 2244 enters a cycle wherein the DMASM 2244 keeps emptying the FIFO 2238 until the FIFO 2238 is empty and no more data is to be received. Once the cycle is intiated, the DMASM 2244 simultaneously functions as the state machine in FIG. 24. In FIG. 24, there are two states—Wait for LDAV 2410 and Wait Until FIFO Empty 2420. The DMASM 2244 begins and remains in Wait for LDAV 2410, but transitions to Wait Until FIFO Empty 2420 if RDMARST (Receive DMA Reset) is negated while RXEN 2222 and LDAVRX 2241 are asserted. The DMASM 2244 remains in Wait Until FIFO Empty 2420 (2411) until the the FIFO 2238 is empty (EF is asserted). If, while the FIFO 2238 is empty (EF is asserted), the DMASM 2244 transitions to Idle 2310, then it also transitions (2422) to Wait for LDAV 2410.

Referring again to FIG. 23, the DMASM remains in Receive Mode 2320 so long as the FIFO 2238 is almost empty (AE is asserted) and the DMASM 2244 is in the Wait for LDAV state 2410. However, if EF is asserted or the DMASM 2244 enters Wait For LDAV 2410, then the DMASM 2244 transitions (2321) to Idle 2310. If AE is asserted while the DMASM 2244 is in Wait for LDAV 2410, then the DMASM 2244 transitions to a DMA Request state 2330. In this transition, the DMASM 2244 request DMA access by asserting DREQ 2216 (2323). In the disclosed embodiment, the i960 maintains four DMA buffers, and DMA requests identify the desired buffer. The DMASM 2244 waits in Receive DMA Request 2330 (2333) until the DMA request is acknowledged (DACK 2219 is asserted), then enables the FIFO 2238 by asserting ENFIFO 2243 (2334) and transitions to a Wait Blast state 2340.

The DMASM 2244 waits in Wait Blast 2340, asserting ENFIFO (2344) until BLAST is asserted. When BLAST is asserted (on line 2217), the DMA receives data from the FIFO 2238. If there is more data in the FIFO 2238 or more data coming (!LDAVIN), then the DMASM 2244 returns to Receive Mode 2320 to cycle through another data transfer. If there is no more data to be received, then the DMASM 2244 signals an appropriate EOP on the FIFO control line 2234 and transitions to an EOP Hold state 2350. EOP Hold 2350 is provided to permit proper interrupt timing. The i960 requires a minimum of three clock cycles for edge triggered interrupts. From EOP Hold 2350, the DMASM 2244 transitions back to Idle 2310.

RXWAIT is asserted as soon as both receive DMA channels are used. Also no more packet reception can start unless at least one Receive Status Register is read by the software driver.

A total of two packets can be captured, one per each receive DMA channel, before packet reception is disabled. Packet reception is disabled until the software driver responds to either of the EOP interrupts pending. Note that EOPs are generated on the processor side of the interface circuit 2220.

In the preferred embodiment, using the i960, a Receive DMA channel select line (RSDMASEL from the DMASM 2244) is toggled at the beginning of every packet reception. This signal is used to alternate between DMA channel 3 or 4 and their related logic. The DMASM 2244 asserts DREQn 2216 (n is either 3 or 4). In response to DREQn 2216, DACKn 2219 is asserted and 128-bits (4×32-bit) of data is transferred from the FIFO 2238 to the memory 2212. Receive DMA cycles (DREQn and DACKn) will continue as long as the end of packet is not detected.

DMASM 2244 transitions to an IDLE state as soon as Last Data In (LDAVIN) 2241 from the FIFO 2238 is asserted. LDAVIN 2241 is one of the four extra data bits of the FIFO 2238 (D32:35) used to indicate the end of a transfer. This bit is propagated through the FIFO 2238 from the backplane side when end of packet transfer is detected (LDAV command, NOPOV or WDTOV).

At the end of the DMA transfer, an End of Packet line (EOPn) 2218 is asserted. This signal causes a CPU interrupt to indicate to the system software (driver) reception of a packet. The EOPn 2218 interrupt invokes the receive software driver. At this time the status of the packet is examined by the driver for processing.

In either case of transmit or receive interrupt, the corresponding DMA channel must be initialized by the software driver for the next packet transfer.

Redundancy

Preferably, complete system redundancy is provided on the P-Bus. As noted above, in the disclosed embodiment, there are two completely redundant control buses A and B, two redundant MPBs, and three redundant 32-bit P-Bus data paths. During normal operation of the disclosed embodiment, the three data paths are concatenated to form a single 96-bit data bus. Redundancy for network connections is handled by configuring multiple connections to the network.

In the event of a failure in one of the 32-bit data paths, the failed data path is disconnected and the P-Bus 10 continues with the remaining two data paths concatenated as a 64-bit data bus. Operation will continue at ⅔ of the original bandwidth.

In the event of a failure in the primary control bus, it is switched out of service and the secondary control bus is switched into service. The system redundancy is controlled by the P-Bus master. In the event of a failure in the active MPB, the inactive MPB will take control of the P-Bus and switch the active MPB out of service.

MPB Redundancy

There are two fixed slots available for Master Processor Boards (MPBs) in the chassis of the router 30. MPBs are distinguished from Interface Processor Boards (IPBS) mainly because they have an Arbitration controller daughter card 54 (FIG. 2) installed. When power is applied, one of the Arbiters 54 takes control of the P-Bus 10 and its corresponding MPB becomes the active MPB. The other MPB, though inactive as a master, continues to monitor the P-BUS, and is available to handle network traffic.

Both the active and standby MPBs monitor P-BUS operation and IPB functionality by sending message packets to every processor board 32, 34. By analyzing the return messages (if any), the MPBs can determine if there is a problem with the P-Bus. The active MPB can reset any processor board, reconfigure data paths and completely switch control paths in an effort to recover from a P-Bus problem. The inactive MPB can reconfigure data and control paths, but cannot reset IPBs unless it usurps active mastership of the P-Bus. The IPBs cannot force any bus reconfiguration, but can recommend it via an appropriate response to message packets from the master MPB.

Data Path Redundancy

Two bits of the redundancy bus [RED1,RED0] of the P-Bus 10 are used to select which of the three 32-bit segments DATA, DATAB, DATAC are used for transmitting data.

The two data path select bits are driven by open collector drivers (not shown) so that if the lines are not driven, the default condition on the bus is [RED1,RED0]=[1,1]. If both MPBs agree that all data paths are working properly, they both drive 0's onto these redundancy bits. If an MPB detects a bad data path, it drives a 1 on the appropriate RED bit(s) to force a data path reconfiguration, even if the other MPB thinks all paths are good.

Control Bus Redundancy

As noted above, there are two complete sets of control paths, Control Bus A and Control Bus B, on the P-Bus. This includes duplicate P-Bus clock, ARB bus, CMD bus, ADD bus and RSP bus of the P-Bus 10. In addition, there are two Arbitration controllers 54 (FIG. 2) that generate the P-Bus access sequences. When an MPB commands a control path switch, all of these buses and the Arbitration controller 54 are switched together. Either MPB can command a switch to the alternate control paths as long as that Arbitration controller 54 is installed.

Three bits of the redundancy register (ASELECT, BSELECT,APRSNT) are used to implement the control path selection.

| | |
|---|---|
| ASELECT (RED3) | Ignored unless set from MPB A. |
| | 1 = Grant Control to Bus A |
| | 0 = Grant Control to Bus B |
| BSELECT (RED4) | Ignored unless set from MPB B. |
| | 1 = Grant Control to Bus A |
| | 0 = Grant Control to Bus B |
| ARBSEL (RED2) | is 1 if Arbitration board 54 for Control Bus B has been granted control; it is negated otherwise. |

Initialization

When power is first applied, both the APRSNT and BPRSNT signals are negated. Whichever MPB comes out of reset first will enable its own Arbitration controller and corresponding control paths, which then locks out the other Arbiter 54. If both Arbiters 54 come on-line at exactly the same time, Arbiter 54 for Control Bus B will be given control. The system will default to using all three 32-bit data paths concatenated into a 96-bit data path.

The system is now initialized and operational. Further action may be taken by either the active MPB or the inactive MPB to control the system redundancy in response to error events.

P-Bus Electrical Specifications

In the illustrated embodiment, the P-Bus 10 uses IEEE896 Futurebus+ BTL transceivers (not shown). All active signals are terminated with a 33 Ohm resistor pulled up to 2.1 Volts and a 0.01 uF decoupling capacitor. The redundancy (RED) bus uses open-collector TTL drivers pulled up on the backplane (not shown).

P-Bus Timing Specifications

The P-Bus signals are all synchronized to the 20 MHz system clock. FIG. 30 shows the required setup and hold times to the rising edge of the system clock for each signal. The setup and hold times are measured at the transmitting board.

P-Bus Physical Specifications

The physical specifications of the illustrated embodiment of the P-Bus backplane 35 and circuit boards 32, 34 plugging into the P-Bus are described below.

Backplane Characteristics

The P-Bus backplane 35 of the illustrated embodiment of FIG. 32 is preferably composed of an eight layer printed circuit board. There is one ground plane and one 2.1 VDC voltage plane. The backplane circuit board is designed such that all active signals have a controlled impedance of 65 Ohms (±10%). There are no active components on the backplane, and all connectors 74 are pressed in. There are, in the illustrated embodiment of FIG. 32, 5 slots with an interslot spacing of 25 mm.

There are 134 BTL, 10 TTL, and 5 DC level signals that are connected to the logic interface section of the connector totalling to 149 lines. 42 ATM signals are not included on the backplane 35. All BTL signals are terminated at 2.1 V at each end of their respective traces using 33 Ohm termination resister networks. Each termination resistor network is decoupled using a 0.1 uF capacitor between 2.1 V and the GROUND plane. All 10 TTL signals (clock lines) are kept equal in length to minimize clock skew on each board. 4 of the DC signals are used to identify slot ID and are pulled up on each board. The 5th DC signal is used to identify backplane type, either 15 slot or 5 slot and is pulled up on each board with a 4.7K Ohm resistor.

In a preferred embodiment, for the Bus Transceiver Logic (BTL) drivers, the Signetics FB2031 is preferred because of its excellent performance under all types of loading conditions. Furthermore, the stub length between the transceiver and the backplane is preferably no greater than 2 inches.

System Clock Distribution

In a preferred embodiment, the P-Bus system clock distributor bus is driven by 74P2525 drivers and distributed in a way which minimizes the skew and maximizes the signal integrity. As shown in FIG. 14, the P-Bus accomplishes this by distributing four clock signals from four drivers in the same chip to groups of boards. The length and impedance of each clock backplane trace is controlled during layout to be equal, and the signal is inserted at the center point of the four boards.

In the illustrated embodiment, for each processor board, the MC88915 is preferred because it ensures synchronization with the P-Bus system clock with minimal phase shift.

The following is a discussion of the router 30 which is intended to provide an example of one environment in which the bus of the present invention may be applied.

Circuit Board

The processor boards of the router 30 of the illustrated embodiment utilize circuit boards that are 300 mm×260 mm in size. The 300 mm width allows up to 138 positions for the four row metric connectors 74 described below. The P-Bus interface uses the first 56 positions for signals and the last 12 positions for power. The remaining connector positions are reserved for other purposes.

Circuit boards are preferably designed so that the P-Bus drivers are as close to the connector as possible so as to minimize the stub length of the traces to the connector.

The Arbitration daughter board 54 is installed on an MPB above the P-Bus drivers in the illustrated embodiment. It interfaces with the MPB through a connector (not shown) which is preferably placed as close to the P-Bus connector 74 as possible.

Connector

Each connector 74 (FIG. 32) used to connect a processor board 32, 34 to the P-Bus backplane 35 is a metric connector with four rows and 2.0 mm between pins. Two connectors 74 are used for connecting to the P-Bus. A 56-position connector (with 4 pins per position) is used for the P-Bus signal connections. It occupies positions 1–56 of the available 138 connector positions on the circuit board. A separate 12-position connector interfaces with the power supply.

CPU Module

As set forth above, the CPU 70 of each processor board 32, 34 is an Intel i960CF RISC processor in the illustrated embodiment. Each processor board includes up to 3 megabytes of Flash memory 50 and 16 megabytes of DRAM 52, which is enough to allow each board to act as a stand alone multiprotocol router.

The interface for the DRAM memory 82 has been optimized for use with the i960 CPU. For instruction fetches using burst memory accesses from the DRAM 52,, the memory access bandwidth is about 70 megabytes per second. When executing from the internal instruction cache of the i960CF, the access time is even faster. The DRAM access bandwidth is allocated entirely to the main CPU 70.

RISC CPU Processor

The i960CF processor 70 has a 32-bit address bus and a 32-bit data bus 84, plus four byte enable lines which select one or more bytes from the 32-bit data word. A single line is used for Read/Write control. The i960CF processor 70 also has an internal 4K instruction cache, 1K of internal data RAM, a 1K data cache configured to serve as additional internal RAM, an integrated interrupt controller and a 4-channel DMA controller 68.

The top four address bits (A31–A28) divide the address space into 16 regions. Each region can be programmed for different access requirements, such as bus size, wait states and normal/burst access. For example, region 0 (00000000-0FFFFFFF), which addresses the data RAM inside the i960 processor 70, is programmed for a 32-bit bus, zero wait states and burst access.

A normal bus access for the i960 CPU 70 takes two clocks. During the first clock cycle, the address and address strobe are asserted, During the second clock, the corresponding data is read or written. A built-in wait state generator can extend a cycle for peripherals that need more access time, or a memory region can be configured so that the CPU 70 will wait for a Ready response before completing the cycle. Both methods are used on the IRP board. For example, the peripherals on the 8-bit bus use programmed wait states, while DRAM accesses wait for a Ready response.

Interrupt Controller

The Interrupt Controller in the i960 CPU 70 is configured to handle 9 dedicated external interrupts, plus the internal interrupts from the DMA controller. There are eight maskable interrupt pins and one non-maskable interrupt (NMI) on the i960CF. These pins have been assigned to the functions as shown in FIG. 31. The priority of these interrupts is set by the application program, except for the NMI, which is always the highest priority.

As FIG. 31 shows, there are four possible reasons for an NMI interrupt. When an NMI occurs, the software must read the status bits from the Control/Status register (not shown) to determine the source of the interrupt.

DMA Controller

The i960CF CPU 70 has an integrated 4-channel DMA controller 68. For each channel, there are pins available for DMA requests (DREQ), DMA acknowledge (DACK), transmit terminal count (TC) and receive End-of-Process (EOP). All four DMA channels are used for transferring data between buffer memory 62 and the P-Bus 10.

FIFO

A bidirectional synchronous First In First Out (FIFO) memory 64 is preferably used as a communication buffer to handle packet transfers to and from the P-Bus. The FIFO 64 used has 2 KByte of RAM organized as two 256×36-bit memory arrays. The FIFO 64 is divided into 2 sections, an A port and a B port. The A port is connected to the processor side which is under control of the DMA controller 66 and the i960 processor's DMA-controller 68. Under normal conditions, the CPU DMA-controller is configured for the quad word fly-by transfer mode of operation to maximize the data transfer rate between the FIFO 64 and system memory 82. The width of the FIFO 64 should be sufficient for transfer of data to and from the memory 82 as well as to and from the backplane 74. In the disclosed embodiment, the depth of the FIFO 64 allows for 64 packets of data on the processor side (128 bits each) and 82 packets of data on the backplane side (96 bits each). The 32-bit word length provides a simple conversion between the 128-bit packets on the processor side and the 96-bit packets on the backplane side. To simplify transfers, the backplane side and the processor side could use equal-size packets.

Port B is connected to transceivers 92 and is controlled with the P-Bus controller 66. The A port is clocked using the buffered processor clock, and the B port is clocked with the bus clock. Only 34 out of 36 data bits of the FIFO are used, 32 bits for processor data and 1 bit for a packet termination flag in each direction. Of course, other sizes of FIFO and other types of memory can also be used.

Interface to Other Modules

The CPU module 36 interfaces with the P-Bus and the Network Interfaces (IFB). These interfaces are discussed in the following sections.

P-Bus Interface Signals

The P-Bus interface module 38 consists of the bidirectional FIFO 64 for sending and receiving data; the P-Bus controller, which implements the P-Bus command/response protocol; and the bank of BTL transceivers 92 for sending and receiving data on the P-Bus.

The P-Bus interface 38 to the CPU module 36 uses the signals as set forth in FIG. 33.

Network Interface Signals

There are several different types of network interface modules (IFB) including Ethernet, Token Ring, Serial (V.35 and V.11), FDDI and ISDN. Each processor board 32, 34 contains up to two network interfaces (IFB). The most common boards have two identical interfaces, but different interfaces on the same board are allowed.

For each network interface (IFB), the number of physical network connections varies from one (e.g., for FDDI) to four (e.g., for Ethernet) or more.

Arbiter Expansion Card

A processor board is converted into a Master Network Processor (MNP) 34 by plugging in an Arbiter expansion card 54. The expansion card contains additional P-Bus interface circuitry to allow the MNP 34 to control the Packet Bus.

The Arbiter expansion card 54 contains the 20 MHz master oscillator clock for the P-Bus. The oscillator drives a buffer to create four copies of the master clock that are divided among all the slots on the backplane 35 (FIG. 32), as shown in FIG. 14.

Figure 15A:
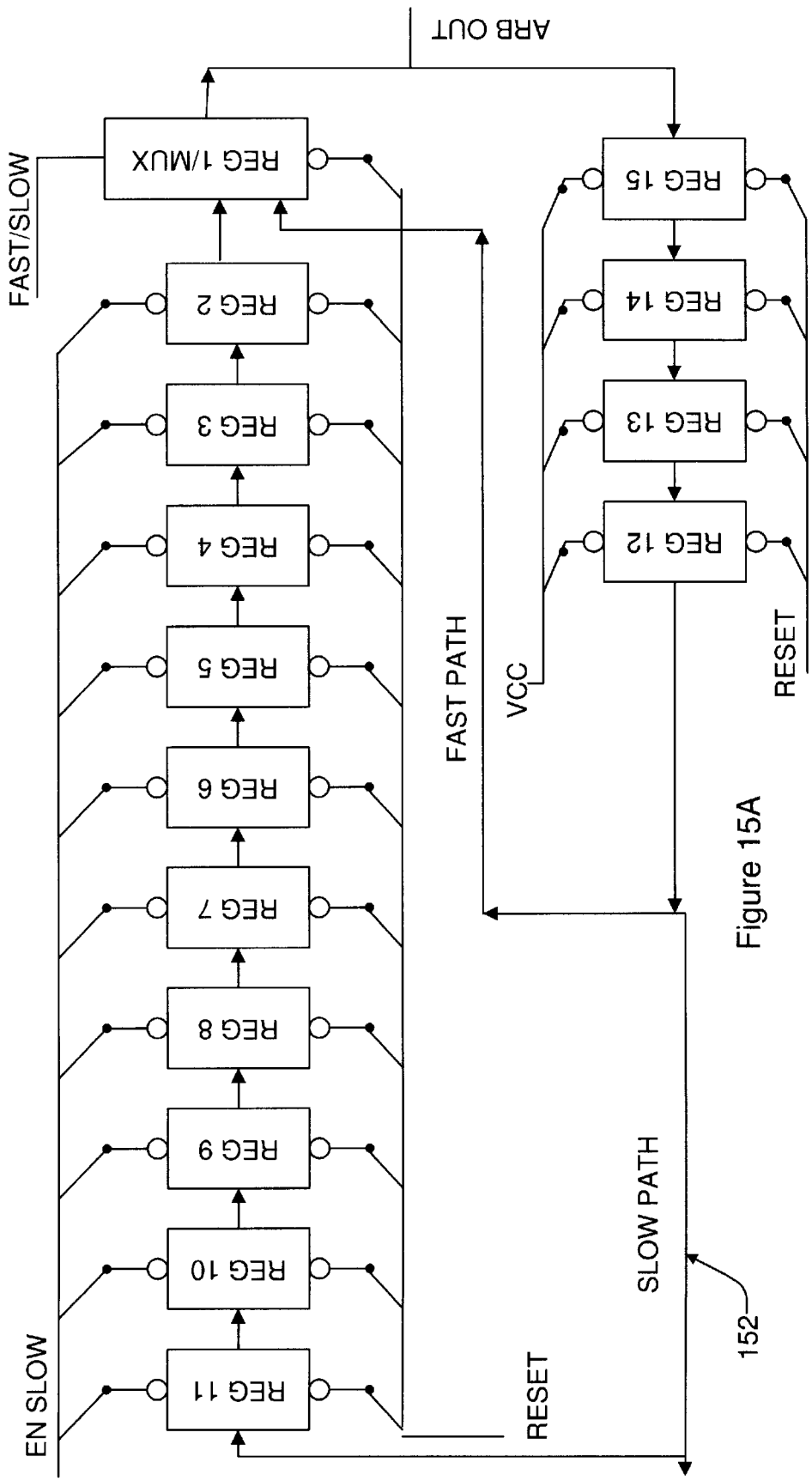
FIG. 15 is a schematic block diagram of the arbitration board of the router of FIG. 2.
Figure 15B:
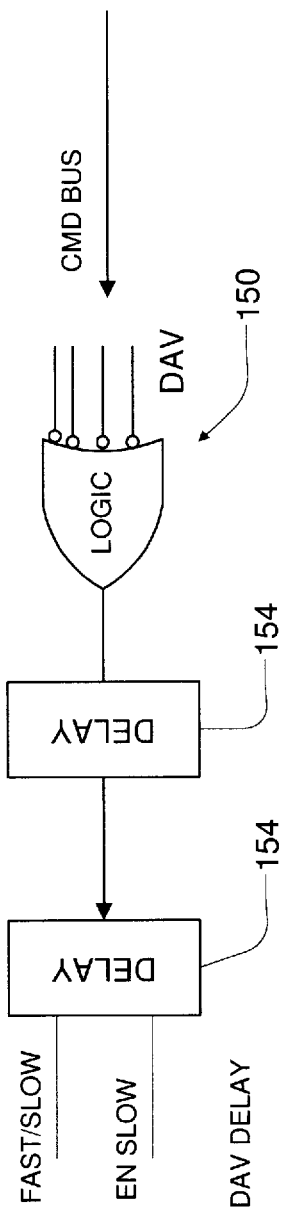

As shown in FIGS. 15A and 15B, the Arbiter expansion card 54 contains logic 150 (FIG. 15B) that monitors the CMD bus. Based on the traffic on that bus, logic 152 (FIG. 15A) generates a selection sequence on the ARB bus that chooses which slot has control of the P-Bus on each clock. More specifically, the arbitration board 54 keeps track of the boards that actively transmitted a command (as opposed to the default NOP) when their slot was last selected on the ARB bus. These are considered to be the active boards for the next selection cycle.

The logic 152 comprises 15 registers 1–15 which are coupled into a circular parallel output shift register. That is, the parallel output of each register is coupled to the input of the next register of the circle. The output of register 1, in addition to being coupled to the input of register 15, is coupled to the ARB bus of the P-bus 10. Upon initiation, a unique slot number is written into each register such that slot number 1 is written into register 1, slot number 2 is written into register 2, etc. Thereafter, once each clock cycle, the contents of each register is shifted into the next register of the circle. In this manner, the output of register 1 and thus the slot number outputted onto the Arbitration bus ARB changes each clock cycle.

As shown in FIG. 15A, the register 1 is also a multiplexer having one input coupled to the output of the register 2 and the other input coupled to the output of register 12. Whether the register 1 selects the output of the register 2 or the output of the register 12 is determined by the multiplexer selection input FAST/SLOW which is generated by the logic 150 of FIG. 15B. The logic 150 monitors the Command bus CMD of the P-Bus. If the CMD bus carries a DAV command indicating that the processor which issued that command is active, the logic 150 after a predetermined delay provided by delay elements 154 will cause the FAST/SLOW multiplexer select signal to go to a logic state designated "FAST" . In response, the register 1 will input the output of the register 12 via the "Fast Path" rather than the output of the register 12. The delay provided by the logic circuit 150 is selected so that by the time that the FAST/SLOW multiplexer select signal changes to the "FAST" state, the slot number of the processor which issued the DAV command which was detected by the logic circuit 150 reaches the register 12 and be output by the register 12. As a consequence, the slot number of the DAV issuing processor jumps to the head of the line (via the Fast Path) and is output by the register 1 onto the ARB bus to select the active processor slot again. Alternatively, if the CMD bus carries a command other than DAV, indicating that the processor which issued that command is (or will be) inactive, the logic 150 after the predetermined delay provided by delay elements 154 causes the FAST/SLOW multiplexer select signal to go to the other logic state designated "SLOW." At that time, the slot number currently outputted by the register 12 corresponds to the inactive processor board which issued the non-DAV command. In response to the multiplexer select signal, "SLOW," the register 1 loads the output of the register 2 rather than the output of the register 12. In addition, an EN SLOW (enable slow) output of the logic circuit 150 is also active which causes the output of each register of the registers 11 to 1 to shift to the next register in the circle. As a consequence, the output of the register 12 is shifted (via the "slow path") to the register 11 rather than the register 1. Each time the logic circuit 150 detects an inactive processor, the slot number of that processor is shifted from the register 12 to the register 11 and the slot numbers in the registers 11 to register 1 are similarly shifted to the next register in the line.

The slot numbers of the active processors circulate in the circle of five registers 1 and 12–15 so that the active processor has its slot number output on the ARB bus once every five clock cycles as long as the processor stays active. Once the processor becomes inactive, the slot number of the inactive processor is shifted to the register 11. Each time the logic circuit 150 detects another inactive processor, the slot numbers of the inactive processors carried by registers 11 to 2 are shifted one at a time to the register 1 and onto the ARB bus.

Thus, it is seen that during a selection cycle, the ARB bus selects each active board slot on consecutive clocks, followed by one inactive board slot. If there are fewer than 4 active boards, additional inactive boards are selected to create a minimum cycle of 5 clocks. On each following selection cycle, the active boards from the previous cycle are selected, followed by a new inactive board slot. In this way, all board slots are repeatedly selected, but processor boards that use the CMD bus when their slot is selected on the ARB bus are granted P-Bus access more often than those boards that issue NOP commands when their slot is selected. In the illustrated embodiment, the minimum time between consecutive selections for an active processor board is 5 clocks (250 ns). For an inactive processor board, the maximum delay until its next selection is 2700 ns assuming a maximum of 4 active processor boards.

Preferably, the data paths carry an extra bit for a parity check. If a parity check indicates that a slot number has been corrupted, then the registers are preferably reloaded with correct slot numbers.

The logic circuits 150 and 152 are implemented by PALs in the illustrated embodiment. Examplar equations for the Arbitration board PALs are provided in Appendix A.

The Arbiter expansion card has control over the 6-bit redundancy bus RED. Based on analysis of test packets, the MNP can force a reconfiguration of the 96-bit DATA bus into a 64-bit bus, or it can force a switchover of the control buses to the alternate set.

The Arbitration connector contains two rows of 20 pins each. Along. with power and ground, it carries the signals as set forth in FIG. 34.

Enhancements and Improvements

One way to improve bus throughput is to allow for multiple connections between data devices. Three improvements to the above-described data communication system are presented. First, each data device could be designed to set up multiple connections (for example up to 4) to other data devices. Second, the data devices could be enabled to perform simultaneous transmit/receive (bi-directionality). This would eliminate some collisions. Third, a broadcasting feature can be implemented, wherein a data source device transmits data to all of the data destination devices at once.

In implementing the multiple-connection feature, a high speed memory is preferred, such as a SRAM. The multiple-connection improvement may be implemented by allowing reception of packets during transmit. This method reduces the number of channel NAKs for cases when a data device has established connection to another data device (slot n to slot m), since another board can set up a channel to the transmitter (slot p to slot n). This implementation is preferably achieved by using two or three bi-directional FIFOs, an external DMA and appropriate changes to the transmit and receive logic of the interface circuit.

In the illustrated embodiment, it takes about 10 $\mu$sec to receive a packet over the bus. If, in a data destination device, dependencies between the backplane side and the processor side are eliminated, more packets can be pushed into the data destination device's FIFO. Assuming that the processor circuit can at least match the rate, this results in less packet rejection and higher throughput.

Another way to increase bus speed is to separate the device driver from data and use two different banks to store code and data. Using EDRAM technology and an external row comparator, code access within the code bank will have a higher chance of cache hits as well as the data buffers located in data bank.

One more way to increase speed is to use hardware memory allocation. By using a sequential access memory on the backplane side, random access memory on the processor side and a FIFO to keep track of the end-of-packet pointers, software can easily pop the location of the next packet in the memory from the pointer FIFO. The packet can be analyzed and the buffer pointer can be used on the transmitter side for packet transmit.

It is seen from the above that the present invention permits access to the bus by more than one channel between a data source and a data destination at a time. Such an arrangement has been found to substantially increase the effective data throughput of the bus without necessitating increases in the clock speed of the bus.

While the description above refers to particular embodiments of the present invention, it will be understood that many modifications may be made without departing from the spirit thereof. The accompanying claims are intended to cover such modifications as would fall within the true scope and spirit of the present invention.

For example, although the CPU of the illustrated embodiment has been described as a particular type of microprocessor, other types of processors and mircoprocessors having on-board and separate DMA circuitry may be used. Similarly, although controllers have been implemented in the illustrated embodiment by programmed PAL circuits, other types of logic circuits including microprocessors, ASIC circuits, discrete logic and the like may be used. Furthermore, although memory circuits of the illustrated embodiment have been described as DRAM other types of memory devices such as SRAM, ROM EDRAM, FRAM, EEROM etc. may be used. Also, the sizes, numbers, and specifications of the various components have been provided for illustration purposes and it should be appreciated that other sizes, numbers and specifications may also be used, depending upon the particular application.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

GLOSSARY

| | |
|---|---|
| Access | ascom Timeplex multiprotocol |
| AE1 | P-Bus FIFO Almost Empty flag for Transmit buffer. |
| AE2 | P-Bus FIFO Almost Empty flag for Receive buffer. |
| BBRAM | Battery backed-up RAM |
| BITE | Built-in monitor and test program |
| BOARDP | This bit distinguishes between MRNPs and RNPs. Logic zero indicates that an arbitration controller board is installed with this board (MRNP). This logic also allows the software to modify the Redundancy Control Register. |
| DACK | DMA Acknowledge |
| DCE | Data Communications Equipment |
| DMA | Direct Memory Access |
| DREQ3:0 | DMA request to processor. DMA channel 0 and 1 are dedicated to transmit and DMA channel 2 and 3 reserved for receive. |
| DTE | Data Terminal Equipment |
| EOP | End Of Process |
| EPROM | Erasable Programmable Read-Only Memory |
| FDDI | Fiberoptic Distributed Data Interface |
| FIFO | First In First Out memory |
| Flash | Electrically erasable non-volatile memory |
| GEO0:3 | Geographical address. CPU can identify which slot it is seated. |
| HSSI | High Speed Serial Interface |
| ID PROM | Programmable Read-only memory containing the serial number, part number and revision information for the board. |
| IFB | InterFace Board |
| IPB | Interface Processor Board |
| IRP | Independent Routing Processor |
| ISDN | Integrated Service Digital Network |
| MPB | Master Processor Board |
| MRXIDLE | PBus Manager receive state machine idle. |
| MTXIDLE | PBus Manager transmit state machine idle. |
| NINDY | Intel-developed debugger/monitor |
| NMI | Non-maskable interrupt |
| P-Bus | Packet Bus |
| PLD | Programmable logic device |
| PRXIDLE | PBus control receive state machine idle. |
| PTXIDLE | PBus control receive state machine idle. |
| RAM | Random access (read/write) memory |
| RDMASEL | Receive DMA channel number. Channel 2 corresponds to RDMASEL equal to logic 0 and channel 3 co-respond to RDMASEL equal to logic 1. |
| RISC | Reduced instruction set computer |
| Router | Routing Network processor |
| RTC | Real time clock |
| RXEDMA | Logic one indicates that receive DMA state machine is in IDLE. |
| RXEN | RX Enable indicates P-Bus is ready in receive mode. |
| RXIDLE | Receive state machine is in IDLE. |
| SIMM | Single in-line memory module |
| TC | Terminal Count |
| TXEDMA | Logic one indicates that the transmit DMA state machine is in IDLE. |
| TXEN | TX Enable indicating P-Bus is in transmit mode. |
| UART | Serial interface IC |
| V.11 | A wide Area Network Interface protocol |
| V.35 | Another wide Area Network Interface protocol. |
| WAN | Wide area network |

It is claimed:

1. A method of operating a data communication system, the data communication system comprising an arbitration device, a first data source device, a second data source device, a first data-sink device, a second data-sink device, the data source devices and data-sink devices each having a slot address associated therewith, an arbitration bus, a control bus including a clock distribution bus, an address buss a response bus, and a data bus, the method comprising:
   a. in the arbitration device:
      i. providing clock signals on the clock distribution bus;
      ii. in each clock period, placing the slot address of one of the data source devices on the arbitration bus. the slot addresses being selected sequentially and repetitively;
   b. in the first data source device which is in a state to send data to a first desired data-sink device:
      i. identifying the slot address associated with the first desired data-sink device;
      ii. receiving the slot address of the first data source device on the arbitration bus in a first clock period;
      iii. transmitting the slot address of the first desired data-sink device on the address bus and a channel request message on the command bus in a second clock period;

iv. receiving an acknowledgment message of the channel request message from the first desired data-sink device on the response bus in a third clock period;

v. transmitting the data from the first data source device to the first desired data-sink device on the data bus in a fourth clock period;

c. in a given second desired data-sink device which is in a state to receive data:

i. receiving the slot address of the second desired data-sink device on the arbitration bus in the second clock period;

ii. transmitting an acknowledgment message from the second desired data-sink device on the response bus in the fourth clock period;

iii. the second desired data sink device receiving the data from the second data source device on the data bus in the fifth clock period.

2. A method as set forth in claim 1, wherein at least one of the first data source device and the second data source device also functions as a data-sink device.

3. A method as set forth in claim 2, wherein in a case where the first data source device has no data to send and is not prepared to receive data:

omitting all of step b;

d. receiving the slot address of the first data source device on the arbitration bus in the first clock period;

e. transmitting a non-acknowledgment message on the response bus in the second clock period.

4. A method as set forth in claim 1, wherein the data communication system also comprises a first interface device and a second device, the first interface device and the second interface device each being between the data source devices and the data sink devices, the data bus accommodates data in blocks and the first interface device has a number of blocks of data to send, in a given data source device, the method of transmitting data further comprises, for each block:

f. receiving the slot address of the given data source device on the arbitration bus in an nth clock period;

g. transmitting the slot address of a given data-sink device on the address bus and a data available message on the command bus in an nth +1 clock period;

h. transmitting a next block of data to the second interface device in an nth+2 clock period.

5. A method as set forth in claim 4, wherein if the given data source device receives a non-acknowledgment message from the given data-sink device in the nth+2 clock period while transmitting a given block of data, resending the given block of data and continuing to send blocks of data.

6. A method of operating a data communication system as set forth in claim 1 wherein the data source addresses and the data-sink addresses are mutually unique.

7. A command/response method for managing data transfers between data sources and data-sinks, respective data transfers occurring between one data source and one data-sink, the method being performed during sequential clock cycles by a pair comprising a selected data source and a selected data-sink, the method comprising the steps of:

(a) a set up step comprising setting up a channel between the selected data source and the selected data-sink;

(b) a new data step comprising signaling from the selected data source to the selected data-sink that new data is available to be sent;

(c) an acknowledgment step comprising acknowledgment by the selected data-sink of receipt of the new data; and (d) a break down step comprising breaking down the channel;

wherein for a first given data source and data-sink pair, the steps are performed sequentially in a first set of sequential clock cycles, and for a second given data source and data-sink pair, the steps are performed sequentially in a second set of sequential clock cycles and staggered by one step from the steps being performed by the first data source and data-sink pair.

8. A command/response method as set forth in claim 7 further comprising the steps of selecting data sources in a calculated order and providing an enable signal for a selected data source during a clock cycle, wherein the set up step further initially comprises waiting for the enable signal for the selected data source.

9. A command/response method as set forth in claim 7 wherein the set up step further comprises the selected data source requesting a channel to the selected data-sink, and the selected data-sink acknowledging acceptance of the channel.

10. A command/response method as set forth in claim 7 further comprising selection of the selected data sources in a calculated order and providing an enable signal for the selected data source during a clock cycle, wherein the new data step further initially comprises waiting for the enable signal for the selected data source.

11. A command/response method as set forth in claim 7, further comprising selection of the selected data sources in a calculated order and providing an enable signal for the selected data source during a clock cycle, wherein the acknowledgment step further initially comprises waiting for the enable signal for the selected data source.

12. A command/response method as set forth in claim 7 wherein for a third given data source and data-sink pair, the steps are performed sequentially in a third set of sequential clock cycles and the third set of sequential clock cycles is staggered from those of the first and second sets of sequential clock cycles.

13. A command/response method as set forth in claim 7 further comprising selection of data sources in a calculated order and providing an enable signal for the selected data source during a clock cycle, wherein the break down step further initially comprises waiting for the enable signal for the selected data source.

14. A command/response method as set forth in claim 7 wherein the channel break down comprises the selected data source transmitting a last data available signal during a clock cycle, then transmitting the last data during a subsequent clock cycle.

15. A command/response method as set forth in claim 7 wherein while the channel set up is being performed for the second given data source and data-sink pair, the data source of the first given pair is preparing data to be sent to the data-sink of the first given pair.

16. A command/response method as set forth in claim 7 wherein the data sources and data-sinks share a common data bus for transmitting data.

17. A command/response method as set forth in claim 7 wherein addresses of the data sources and addresses of the data-sinks are mutually unique, and the data sources and data-sinks share a common address bus for transmitting addresses.

18. A command/response method as set forth in claim 7 wherein the data-sinks transmit acknowledgments on a common response bus.

19. A command/response method as set forth in claim 7 wherein the selected data source signals that new data is available on a command bus and the selected data-sink acknowledges receipt of data on a response bus distinct from the command bus.

20. A command/response method as set forth in claim 8 wherein the order of selection of the data sources is based upon previous data transmission activity of the data sources.

21. A command/response method as set forth in claim 8 wherein if the selected data source receives the enable signal but has no data to send, then the selected data source signals that it has no data to send.

22. A command/response method as set forth in claim 8 wherein the calculated order comprises repetitively selecting the data sources sequentially.

23. A command/response method as set forth in claim 20 wherein if a selected data source receives the enable signal but has no data to send, then the selected data source signals that it has no data to send, and the selected data source is skipped during the next selection sequence.

24. In a data communication system having a bus for routing data between a plurality of channels, each channel comprising a data source device and a data destination device, and the bus having a clock for defining a plurality of sequential clock cycles, an arbitration processor, a command bus, an address bus, a response bus, and a data bus, a method for operating the data communication system, comprising the steps of:

selecting data sources in a calculated order using the arbitration processor;

providing an enable signal for a single selected data source during each clock cycle;

transmitting, on the command bus, during a first clock cycle, a command from a first enabled data source;

transmitting, on the command bus, during a second clock cycle, a command from a second enabled data source;

transmitting, on the command bus, during a third clock cycle, a command from a third enabled data source;

transmitting, on the command bus, channel control commands;

transmitting, on the address bus, during the first clock cycle, the address of a first data destination to be used by the first data source;

transmitting, on the address bus, during the second clock cycle, the address of a second data destination to be used by the second data source;

transmitting, on the address bus, during the third clock cycle, the address of a third data destination to be used by the third data source;

transmitting, on the response bus, during the second clock cycle, a response by the first data destination to the command from the first data source;

transmitting, on the response bus, during the third clock cycle a response by the second data destination to the command from the second data source;

transmitting, on the response bus, during a fourth clock cycle, a response by the third data destination to the command from the third data source;

transmitting, on the data bus, during the third clock cycle, data from the first data source to the first data destination;

transmitting, on the data bus, during the fourth clock cycle, data from the second data source to the second data destination, and during a fifth third clock cycle data from the third data source to the third data destination; and allowing set up and delivery of data for plural channels to overlap in each clock cycle.

25. A method as set forth in claim 24 wherein at least one of the data source devices also functions as a data destination device.

26. A method as set forth in claim 24 wherein when a given data source device has no data to send and is not prepared to receive data then performing the additional steps of:

receiving a slot address of the given data source device on the arbitration bus in a nth clock period and transmitting a non-acknowledgment message on the response bus in a nth+1 clock period.

27. A method as set forth in claim 24, wherein the data communication system also comprises a first interface device and a second device, the first interface device and the second interface device each being between the data source devices and the data destination devices, the data bus accommodates data in blocks and the first interface device has a number of blocks of data to send, in a given data source device, the method of transmitting data further comprises, for each block:

receiving the slot address of the given data source device on the arbitration bus in an nth clock period;

transmitting the slot address of the a given data destination device on the address bus and a data available message on the command bus in an nth+1 clock period; and transmitting a next block of data to the second interface device in an nth+2 clock period.

28. A method as set forth in claim 26, wherein if the given data source device receives a non-acknowledgment message from the given data destination device in the nth+2 clock period while transmitting a given block of data, resending the given block of data and continuing to send blocks of data.

29. A method as set forth in claim 24, further comprising the steps of:

each selected data source requesting a channel to be assigned to each respective selected data destination, and each selected data destination acknowledging acceptance of the channel assignment.

30. A method as set forth in claim 34 wherein addresses of the data sources and the address of the data destinations addresses are mutually unique, and the data sources and data destinations share a common address bus for transmitting addresses.

31. A method as set forth in claim 24 wherein the data destinations transmit acknowledgments on a common response bus.

32. A method, as set forth in claim 24, wherein the data communication system also has an arbitration bus and comprising the additional step of transmitting a slot address of a desired data source device on the arbitration bus.

33. In a data communication system having a bus for routing data between a plurality of channels, each channel comprising a data source device and a data destination device, and the bus having clock for defining a plurality of sequential clock cycles, an arbitration processor, a command bus, an address bus, a response bus, and a data bus, a method for operating the data communication system, comprising the steps of:

selecting data sources in a calculated order using the arbitration processor;

providing an enable signal for one selected data source during each clock cycle;

transmitting, on the command bus, during a xth clock cycle, a command from a first enabled data source;

transmitting, on the command bus, during a yth clock cycle, a command from a second enabled data source;

transmitting, on the command bus, during a zth clock cycle, a command from a third enabled data source;

transmitting, on the command bus, channel control commands;

transmitting, on the address bus, during the xth clock cycle, the address of a first data destination by the first data source;

transmitting, on the address bus, during the yth clock cycle, the address of a second data destination by the second data source;

transmitting, on the address bus, during the zth clock cycle, the address of a third data destination by the third data source;

transmitting, on the response bus, during the yth clock cycle, a response by the first data destination to the command from the first data source;

transmitting, on the response bus, during the zth clock cycle a response by the second data destination to the command from the second data source;

transmitting, on the response bus, during a vth clock cycle, a response by the third data destination to the command from the third data source;

transmitting, on the data bus, during the zth clock cycle, data from the first data source to the first data destination;

transmitting, on the data bus, during the vth clock cycle, data from the second data source to the second data destination, and during a wth third clock cycle data from the third data source to the third data destination; and allowing set up and delivery of data for plural channels to overlap in each clock cycle wherein v,w,x, and z are all integer numbers and $v \neq w \neq x \neq y \neq z$.

34. A method, as set forth in claim 33, wherein the data communication system also has an arbitration bus and comprising the additional step of transmitting a slot address of a desired data source device on the arbitration bus.

* * * * *

UNITED STATES PATENT AND TRADEMARK OFFICE
CERTIFICATE OF CORRECTION

PATENT NO. : 5,857,087　　　　　　　　　　　　　　　　Page 1 of 4
DATED　　　 : January 5, 1999
INVENTOR(S) : Majid Bemanian, et al It is certified that error appears in the above-identified patent and that said Letters Patent is hereby corrected as shown below:

In Col. 11, line 46, please delete "sender'lot" and substitute in place thereof - - sender's lot - -;

In Col. 12, line 54, please delete "(TXSM)" and substitute in place thereof - - (TxSM) - -;

In Col. 12, line 55, please delete "(TXMSM)" and substitute in place thereof - - (TxMSM) - -;

In Col. 13, line 1, please delete "Aside" and substitute in place thereof - - A-side - -;

In Col. 14, line 7, please delete "TXSM" and substitute in place thereof - - TxSM - -;

In Col. 14, line 30, please delete "TXMSM" and substitute in place thereof - - TxMSM - -;

In Col. 14, line 34, please delete "TXMSM" and substitute in place thereof - - TxMSM - -;

In Col. 14, line 40, please delete "TXSM" and substitute in place thereof - - TxSM - -;

In Col. 14, line 62, please delete "TXSM" and substitute in place thereof - - TxSM - -;

In Col. 14, line 66, please delete "TXSM" and substitute in place thereof - - TxSM - -;

In Col. 15, line 16, please delete "TXSM" and substitute in place thereof - - TxSM - -;

In Col. 15, line 29, please delete "TXSM" and substitute in place thereof - - TxSM - -;

In Col. 15, line 35, please delete "TXSM" and substitute in place thereof - - TxSM - -;

In Col. 15, line 50, please delete "TXSM" and substitute in place thereof - - TxSM - -;

UNITED STATES PATENT AND TRADEMARK OFFICE
CERTIFICATE OF CORRECTION

PATENT NO. : 5,857,087　　　　　　　　　　　　　　Page 2 of 4
DATED　　　 : January 5, 1999
INVENTOR(S) : Majid Bemanian, et al It is certified that error appears in the above-identified patent and that said Letters Patent is hereby corrected as shown below:

In Col. 15, line 54, please delete "TXSM" and substitute in place thereof - - TxSM - -;

In Col. 16, line 5, please delete "TXSM" and substitute in place thereof - - TxSM - -;

In Col. 19, line 36, please delete "TXSDMA" and substitute in place thereof - - TxSDMA - -;

In Col. 19, line 66, please delete "TXSM" and substitute in place thereof - - TxSM - -;

In Col. 20, line 54, please delete "RXSM" and substitute in place thereof - - RxSM - -;

In Col. 20, line 55, please delete "RXMSM" and substitute in place thereof - - RxMSM - -;

In Col. 21, line 40, please delete "RXSDMA" and substitute in place thereof - - RxSDMA - -;

In Col. 22, line 8, please delete "RXSM" and substitute in place thereof - - RxSM - -;

In Col. 22, line 16, please delete "RXSM" and substitute in place thereof - - RxSM - -;

In Col. 22, line 42, please delete "RXSM" and substitute in place thereof - - RxSM - -;

In Col. 22, line 54, please delete "RXSM" and substitute in place thereof - - RxSM - -;

In Col. 22, line 58, please delete "RXSDMA" and substitute in place thereof - - RxSDMA - -;

UNITED STATES PATENT AND TRADEMARK OFFICE
CERTIFICATE OF CORRECTION

PATENT NO. : 5,857,087
DATED : January 5, 1999
INVENTOR(S) : Majid Bemanian, et al It is certified that error appears in the above-identified patent and that said Letters Patent is hereby corrected as shown below:

In Col. 22, line 66, please delete "RXMSM" and substitute in place thereof - - RxMSM - -;

In Col. 23, line 2, please delete "RXSDMA" and substitute in place thereof - - RxSDMA - -;

In Col. 23, line 10, please delete "RXMSM" and substitute in place thereof - - RxMSM - -;

In Col. 24, line 60, please delete "RXMSM" and substitute in place thereof - - RxMSM - -;

In Col. 24, line 61, please delete "RXSDMA" and substitute in place thereof - - RxSDMA - -;

In Col. 24, line 63, please delete "RXSM" and substitute in place thereof - - RxSM - -;

In Col. 25, line 3, please delete "RXMSM" and substitute in place thereof - - RxMSM - -;

In Col. 26, line 51, please delete "(IPBS)" and substitute in place thereof - - (IPBs) - -;

UNITED STATES PATENT AND TRADEMARK OFFICE
CERTIFICATE OF CORRECTION

PATENT NO. : 5,857,087
DATED     : January 5, 1999
INVENTOR(S) : Majid Bemanian, et al It is certified that error appears in the above-identified patent and that said Letters Patent is hereby corrected as shown below:

In Col. 30, line 6, please delete "bidirectional" and substitute in place thereof
- - bi-directional - -;

In Col. 34, line 51 (Claim 1), please delete the word "buss" and substitute in place thereof - - bus,- -;

Signed and Sealed this

Fourteenth Day of September, 1999

Attest:

Q. TODD DICKINSON

*Attesting Officer*     *Acting Commissioner of Patents and Trademarks*